(12) United States Patent
Hakeem et al.

(10) Patent No.: US 10,837,395 B2
(45) Date of Patent: Nov. 17, 2020

(54) METHODS AND SYSTEMS TO CONTROL FUEL SCAVENGING IN A SPLIT EXHAUST ENGINE

(71) Applicant: Ford Global Technologies, LLC, Dearborn, MI (US)

(72) Inventors: Mohannad Hakeem, Dearborn, MI (US); Ashley Peter Wiese, Ann Arbor, MI (US); Daniel Madison, Dearborn, MI (US); Brad Boyer, Canton, MI (US); Dushyant Karthikeyan, Ypsilanti, MI (US); William Cary Cole, Wixom, MI (US); Joseph Norman Ulrey, St. Joseph, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 16/293,506

(22) Filed: Mar. 5, 2019

(65) Prior Publication Data
US 2020/0284217 A1 Sep. 10, 2020

(51) Int. Cl.
*F02D 13/02* (2006.01)
*F02D 41/00* (2006.01)
(Continued)

(52) U.S. Cl.
CPC ......... *F02D 41/401* (2013.01); *F01N 13/107* (2013.01); *F02D 13/0249* (2013.01);
(Continued)

(58) Field of Classification Search
CPC ............. F02D 13/0249; F02D 41/0047; F02D 41/0065; F02D 41/064; F02D 41/401;
(Continued)

(56) References Cited

U.S. PATENT DOCUMENTS 6,742,506 B1   6/2004   Grandin
8,069,663 B2   12/2011   Ulrey et al.
(Continued)

FOREIGN PATENT DOCUMENTS

WO       2016128642 A1     8/2016

OTHER PUBLICATIONS

Madison, D. et al., "Method for Determining a Dilution of Recirculated Gases in a Split Exhaust Engine," U.S. Appl. No. 15/926,970, filed Mar. 20, 2018, 75 pages.

(Continued)

*Primary Examiner* — Audrey K Bradley
(74) *Attorney, Agent, or Firm* — Geoffrey Brumbaugh; McCoy Russell LLP

(57) ABSTRACT

Methods and systems are provided for adjusting amount of directly injected fuel scavenged via a second exhaust manifold of a split exhaust engine system. In one example, a method may include adjusting a start of injection of a fuel direct injection into an engine cylinder, the cylinder including a first exhaust valve coupled to a first exhaust manifold and a second exhaust valve coupled to a second exhaust manifold, the second exhaust manifold coupled to an intake of the engine, based on a closing timing of the second exhaust valve and dependent on an operating condition, and adjusting a position of a bypass valve of the second exhaust manifold based on the adjusted start of injection. In this way, the amount of scavenged fuel may be increased or decreased based on the operating condition.

20 Claims, 8 Drawing Sheets

(51) Int. Cl.
    *F02D 41/06*     (2006.01)
    *F02D 41/40*     (2006.01)
    *F01N 13/10*     (2010.01)
    *F02M 26/09*     (2016.01)
    *F02M 26/22*     (2016.01)
    *F02M 26/14*     (2016.01)
    *F02M 26/07*     (2016.01)
    *F02D 41/38*     (2006.01)

(52) U.S. Cl.
    CPC ..... *F02D 41/0047* (2013.01); *F02D 41/0065* (2013.01); *F02D 41/064* (2013.01); *F02M 26/07* (2016.02); *F02M 26/09* (2016.02); *F02M 26/14* (2016.02); *F02M 26/22* (2016.02); *F02D 2013/0292* (2013.01); *F02D 2041/389* (2013.01); *F02D 2200/10* (2013.01)

(58) Field of Classification Search
    CPC ....... F02D 2013/0292; F02D 2041/389; F01N 13/107; F02M 26/07; F02M 26/09; F02M 26/14
    See application file for complete search history.

(56) References Cited

U.S. PATENT DOCUMENTS

| | | | |
|---|---|---|---|
| 8,272,632 | B2 | 9/2012 | Honmochi et al. |
| 8,479,511 | B2 | 7/2013 | Pursifull et al. |
| 8,495,992 | B2 | 7/2013 | Roth |
| 8,511,084 | B2 | 8/2013 | Ulrey et al. |
| 8,539,770 | B2 | 9/2013 | Williams |
| 8,601,811 | B2 | 12/2013 | Pursifull et al. |
| 8,701,409 | B2 | 4/2014 | Pursifull et al. |
| 9,080,523 | B1 | 7/2015 | Ulrey et al. |
| 9,534,567 | B2 | 1/2017 | Ulrey et al. |
| 10,012,159 | B1 | 7/2018 | Ulrey et al. |
| 10,018,123 | B1 | 7/2018 | Ulrey et al. |
| 10,024,255 | B2 | 7/2018 | Ulrey et al. |
| 10,060,371 | B2 | 8/2018 | Ulrey |
| 10,094,310 | B2 | 10/2018 | Ulrey et al. |
| 10,107,220 | B2 | 10/2018 | Ulrey et al. |
| 10,132,235 | B2 | 11/2018 | Ulrey et al. |
| 10,138,822 | B2 | 11/2018 | Ulrey et al. |
| 10,145,315 | B2 | 12/2018 | Ulrey et al. |
| 10,161,332 | B2 | 12/2018 | Ulrey et al. |
| 10,190,507 | B2 | 1/2019 | Ulrey et al. |
| 2010/0263639 | A1 | 10/2010 | Uhrich et al. |
| 2011/0126519 | A1* | 6/2011 | Okada ................ F02D 41/0007 60/276 |
| 2015/0316005 | A1 | 11/2015 | Madison et al. |
| 2018/0170353 | A1 | 6/2018 | Ulrey et al. |
| 2018/0171845 | A1 | 6/2018 | Veiga Pagliari et al. |
| 2018/0171868 | A1 | 6/2018 | Leone et al. |
| 2018/0171897 | A1 | 6/2018 | Boyer et al. |
| 2018/0171898 | A1 | 6/2018 | Ulrey et al. |
| 2018/0171899 | A1 | 6/2018 | Ulrey et al. |
| 2018/0171904 | A1 | 6/2018 | Ulrey et al. |
| 2018/0171907 | A1 | 6/2018 | Ulrey et al. |
| 2018/0171913 | A1 | 6/2018 | Ulrey et al. |

OTHER PUBLICATIONS

Surnilla, G. et al., "Method for Determining a Dilution of Recirculated Gases in a Split Exhaust Engine," U.S. Appl. No. 15/926,940, filed Mar. 20, 2018, 72 pages.

* cited by examiner

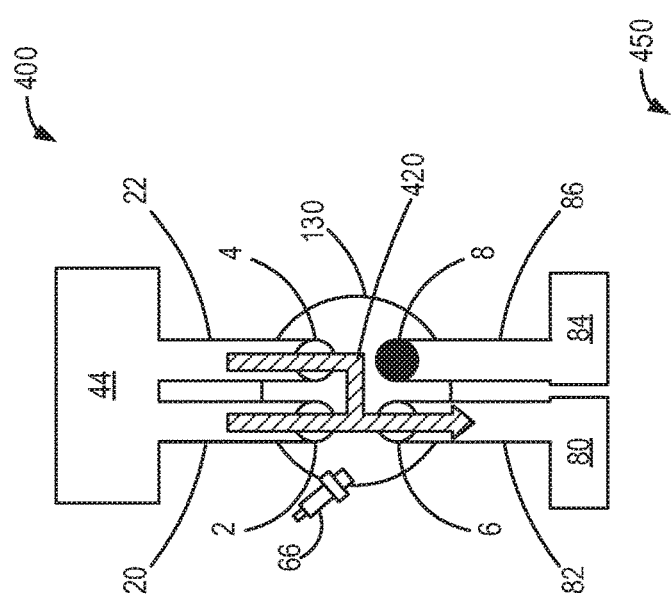
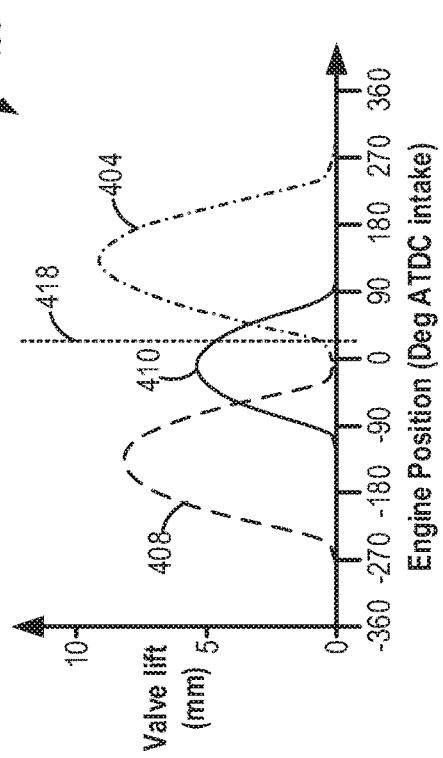
FIG. 4B
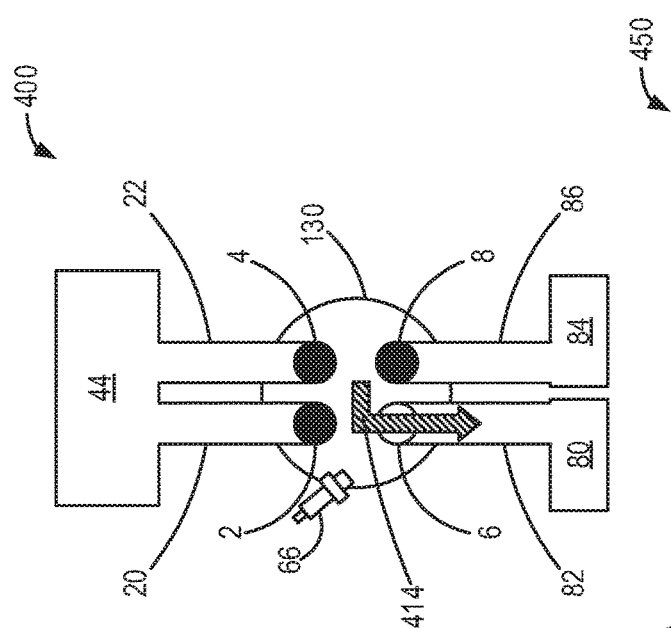
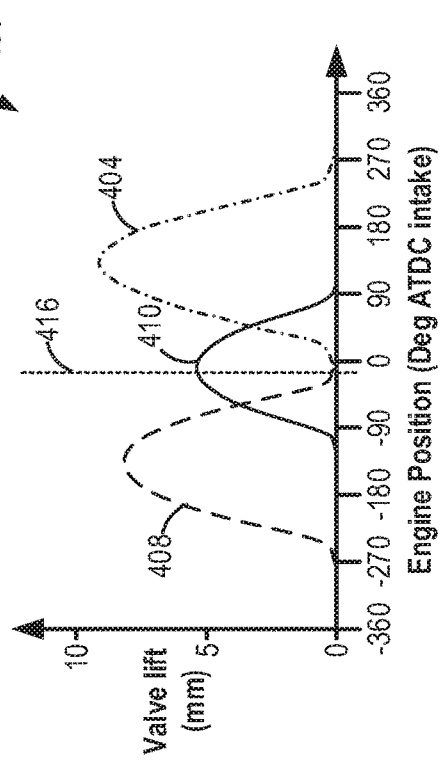
FIG. 4A

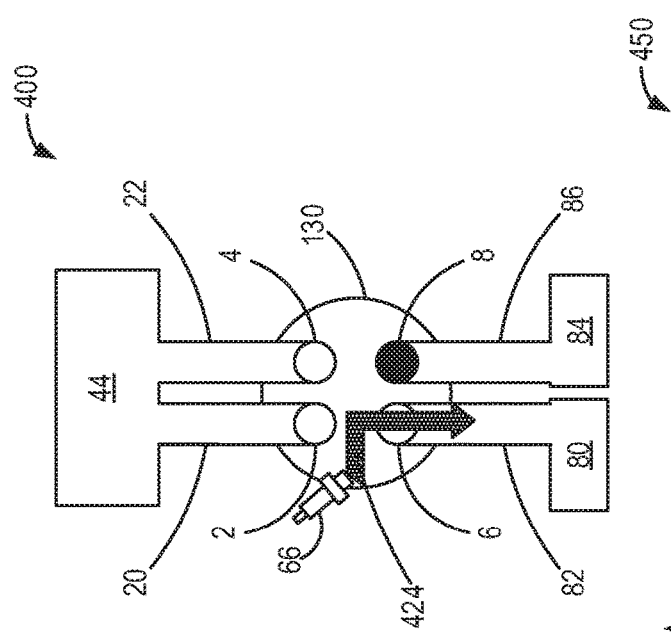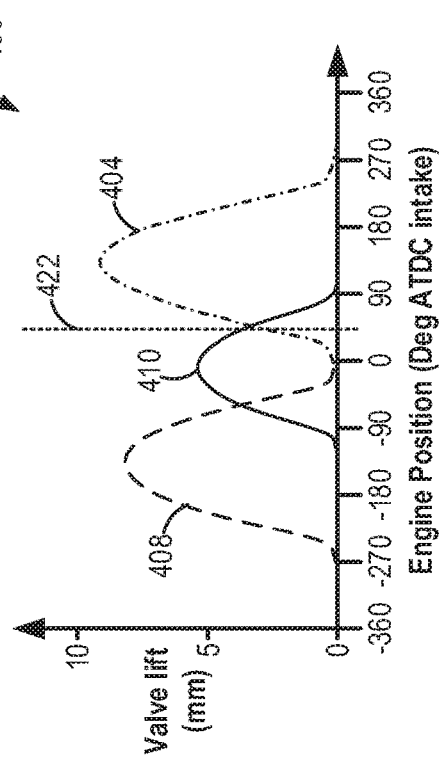
FIG. 4C
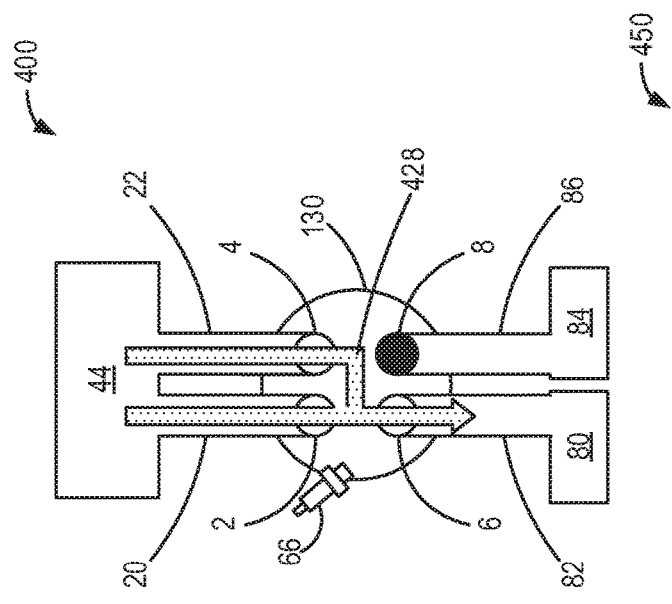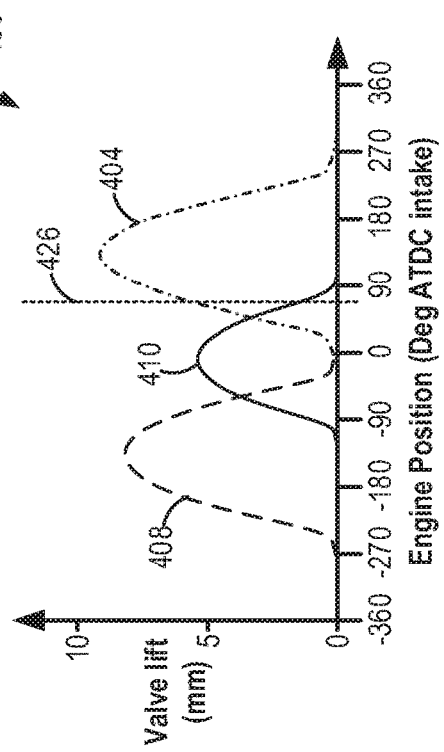
FIG. 4D

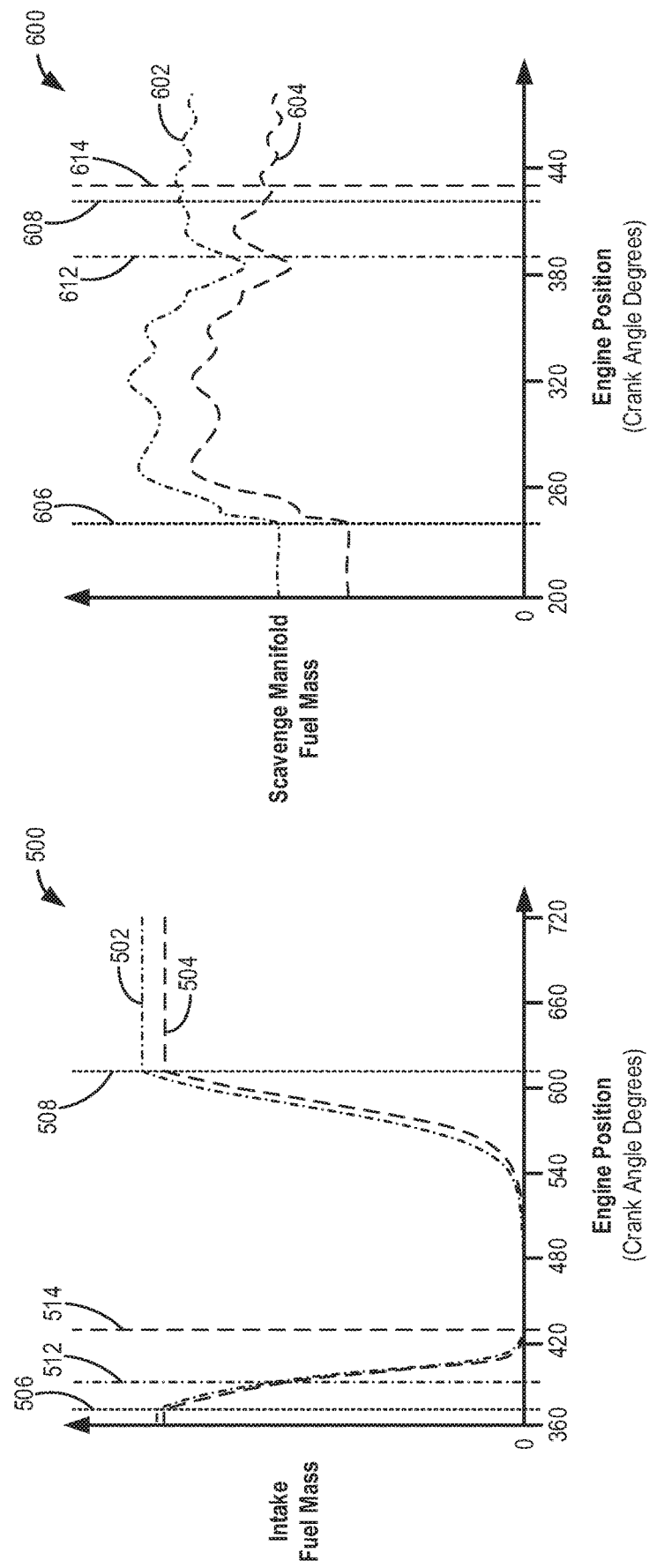

METHODS AND SYSTEMS TO CONTROL FUEL SCAVENGING IN A SPLIT EXHAUST ENGINE

FIELD

The present description relates generally to systems and methods for an engine having a split exhaust system.

BACKGROUND/SUMMARY

Engines may use boosting devices, such as turbochargers, to increase engine power density. However, engine knock may occur due to increased combustion temperatures. Knock is especially problematic under boosted conditions due to high charge temperatures. The inventors herein have recognized that a split exhaust system, where a first exhaust manifold routes exhaust to a turbine of the turbocharger in an exhaust of the engine and a second exhaust manifold routes exhaust gas recirculation (EGR) to an intake of the engine, upstream of a compressor of the turbocharger, may decrease engine knock and increase engine efficiency. In such an engine system, each cylinder may include two intake valves and two exhaust valves, where a first set of cylinder exhaust valves (e.g., blowdown exhaust valves) are exclusively coupled to the first exhaust manifold via a first set of exhaust ports, and a second set of cylinder exhaust valves (e.g., scavenge exhaust valves) are exclusively coupled to the second exhaust manifold via a second set of exhaust ports. The first set of cylinder exhaust valves may be operated at a different timing than the second set of cylinder exhaust valves, thereby isolating a blowdown portion and a scavenging portion of exhaust gases. The timing of the second set of cylinder exhaust valves may also be coordinated with a timing of the cylinder intake valves to create a positive valve overlap period where fresh intake air (or a mixture of fresh intake air and EGR), referred to as blow-through, may flow through the cylinders and back to the intake, upstream of the compressor, via an EGR passage coupled to the second exhaust manifold. Blowthrough air may remove residual exhaust gases from within the cylinders (referred to as scavenging). The inventors herein have recognized that by flowing a first portion of the exhaust gas (e.g., higher pressure exhaust) through the turbine and a higher pressure exhaust passage and flowing a second portion of the exhaust gas (e.g., lower pressure exhaust) and blowthrough air to the compressor inlet, combustion temperatures can be reduced while increasing a work efficiency of the turbine and increasing engine torque.

However, the inventors herein have recognized potential issues with such systems. As one example, in the engine system described above, a composition of gas recirculated to the intake may be more complex than in a traditional EGR system comprising a single exhaust manifold or a system that does not recirculate increased volumes of blowthrough air. Whereas recirculated gas in traditional EGR systems is primarily comprised of combusted exhaust gas, the gas recirculated through the split exhaust engine may include varying portions of combusted exhaust gas, fresh air, and non-combusted (e.g., unburnt) fuel. In particular, a portion of non-combusted, directly injected fuel may flow through the scavenge exhaust valve to the second exhaust manifold if it is injected while the scavenge exhaust valve is open, a process referred to herein as fuel scavenging or short-circuiting of fuel. This may result in fuel loss that is difficult to track during some engine operating conditions, especially during transient conditions. Timing adjustments of engine operating parameters, such as fuel injection amount, spark advance, and intake and exhaust valve actuation may not account for the short-circuited fuel, resulting in degraded engine performance. However, during other engine operating conditions, short-circuiting of fuel may be advantageous. For example, short-circuiting of fuel may be desired during warm up conditions, such as an engine cold start, in order to flow additional fuel to a catalyst.

In one example, the issues described above may be addressed by a method comprising: adjusting a start of a direct fuel injection into an engine cylinder including a first exhaust valve coupled to a blowdown manifold and a second exhaust valve coupled to a scavenge manifold based on a closing timing of the second exhaust valve and an operating condition; and adjusting a position of a bypass valve of the scavenge manifold based on the adjusted start of the direct fuel injection. In this way, the start of the direct fuel injection may be adjusted to either increase fuel scavenging or decrease fuel scavenging based on the particular operating condition.

As one example, the operating condition may include a condition during which decreased fuel scavenging is desired. For example, the operating condition may be a transient condition, in which operating parameters of the engine (such as engine speed, engine load, and manifold pressure) may rapidly change, making an amount of scavenged fuel difficult to track. As another example, the operating condition is a high engine speed/load condition, during which there is a high creation of scavenged fuel if corrective actions are not performed. Therefore, during the transient condition and the high engine speed/load condition, adjusting the start of the direct fuel injection may include retarding the start of injection relative to the closing timing of the second exhaust valve, thereby decreasing an amount of overlap between the direct fuel injection and an open duration of the second exhaust valve. For example, the start of the direct fuel injection may be retarded until after the second exhaust valve closes. As a result, fuel scavenging may be decreased during the transient condition and the high engine speed/load condition. Further, the position of the bypass valve may be adjusted based on the retarded start of the direct fuel injection to further decrease fuel scavenging. Adjusting the bypass valve, positioned in a bypass passage that couples the scavenge manifold to an exhaust passage downstream of a turbocharger turbine, affects pressure and flow characteristics of the scavenge manifold (and thus the second exhaust valve). For example, the bypass valve may be adjusted to a further closed position in order to decrease flow through the second exhaust valve, thereby further decreasing fuel flow through the second exhaust valve. By decreasing fuel scavenging during transient conditions and high engine speed/load conditions, an amount of fuel loss during an engine cycle to scavenging may be decreased, and engine operating parameters, including fuel injection amount, spark advance, and intake and exhaust valve actuation, may be more accurately controlled.

As another example, the operating condition may include a condition during which increased fuel scavenging is desired. For example, the operating condition may be an engine cold start. Therefore, during the engine cold start, adjusting the start of the direct fuel injection may include advancing the start of the direct fuel injection relative to the closing timing of the second exhaust valve, thereby increasing the amount of overlap between the direct fuel injection and the open duration of the second exhaust valve. For example, the start of the direct fuel injection may be advanced well before the second exhaust valve closes. As a result, fuel scavenging may be increased during the engine cold start. Further, an amount of fuel injected during the direct fuel direction injection may be increased in order to enrich the air-fuel ratio during the cold start. Further, the position of the bypass valve may be adjusted based on the advanced start of the direct fuel injection to further increase fuel scavenging. For example, the bypass valve may be adjusted to a further open position in order to increase flow through the second exhaust valve as well as deliver air and fuel from the scavenge manifold directly to the exhaust passage and to a downstream catalyst. However, recirculating the scavenged fuel through an exhaust gas recirculation passage that couples the scavenge manifold to an intake of the engine may increase fuel evaporation, thereby decreasing particulate matter emissions during the enriched cold start. By increasing fuel scavenging during an engine cold start, catalyst warm-up may be expedited while cold start emissions are decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 4A-4D schematically illustrate sources of different recirculated gases throughout an open duration of the scavenge exhaust valve with respect to example engine positions.

FIG. 5 shows an example graph of a relationship between a start of injection timing of a fuel direct injection during an intake stroke and an amount of fuel in pushback gases.

FIG. 6 shows an example graph of a shows a relationship between a start of injection timing of a fuel direct injection during an intake stroke and an amount of fuel short-circuited to a scavenge manifold via a scavenge exhaust valve.

DETAILED DESCRIPTION

Figure 1:
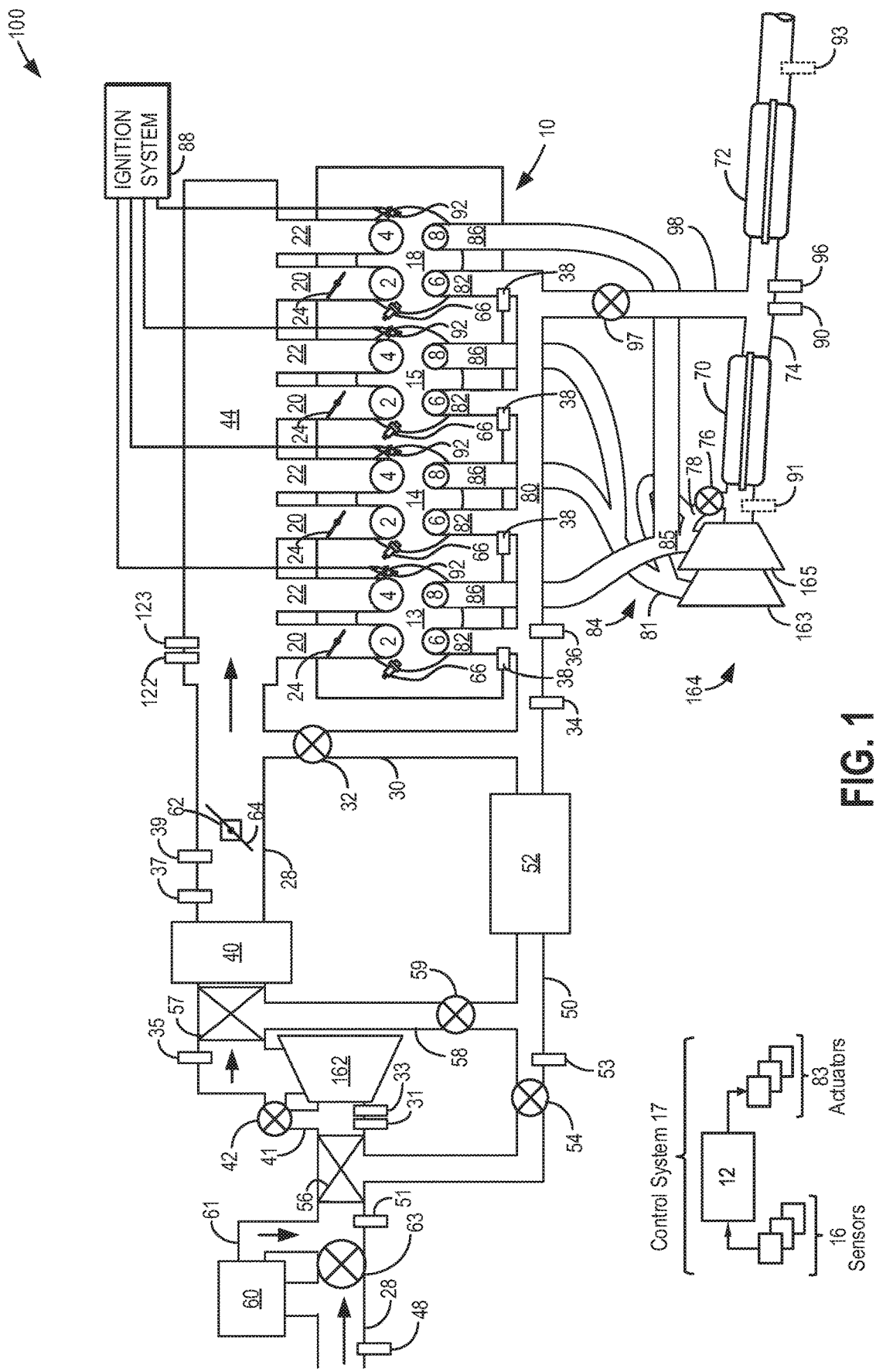
FIG. 1 shows a schematic depiction of a turbocharged engine system with a split exhaust system.
Figure 2:
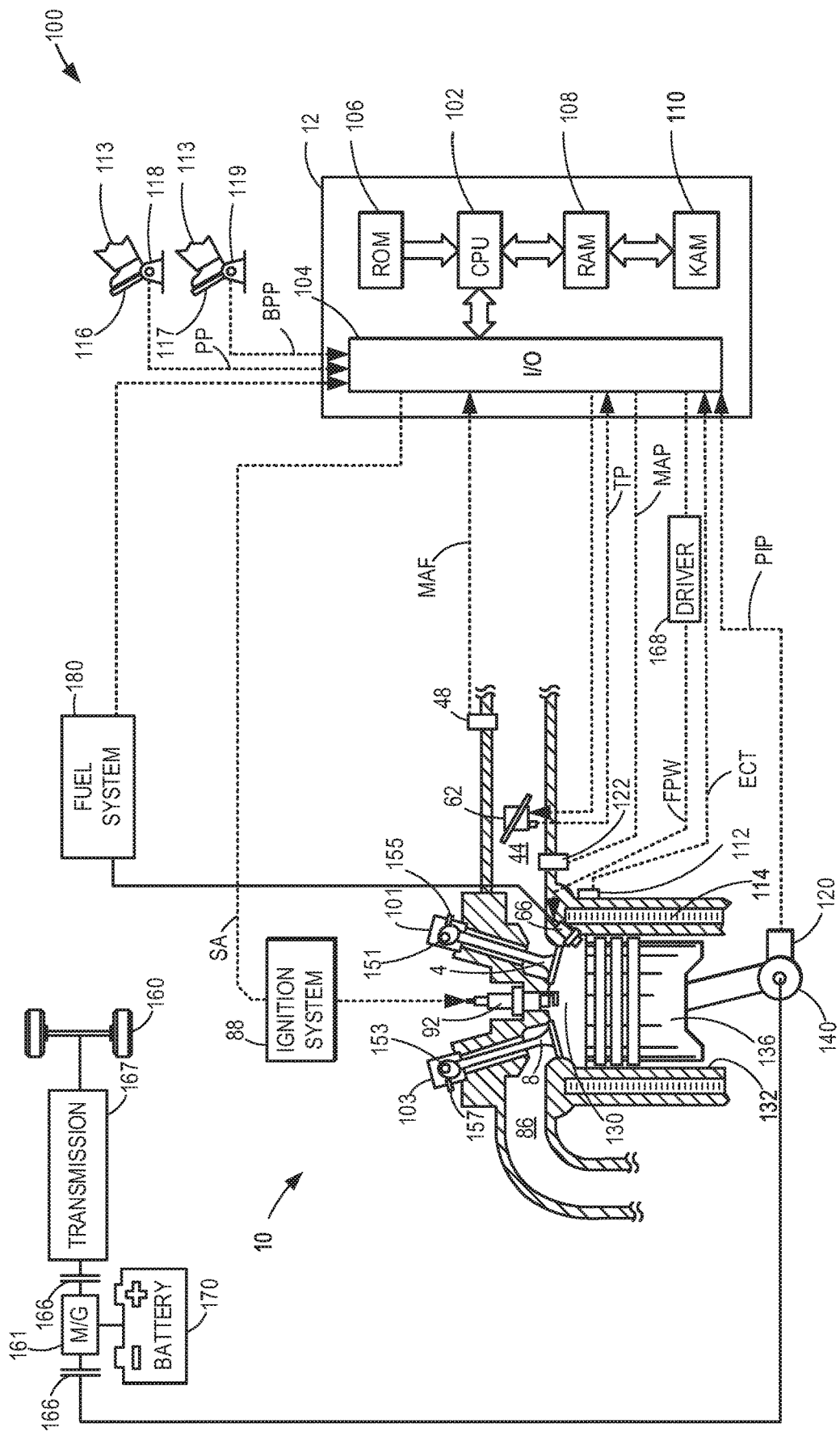
FIG. 2 shows an embodiment of a cylinder of the engine system of FIG. 1.
Figure 3:
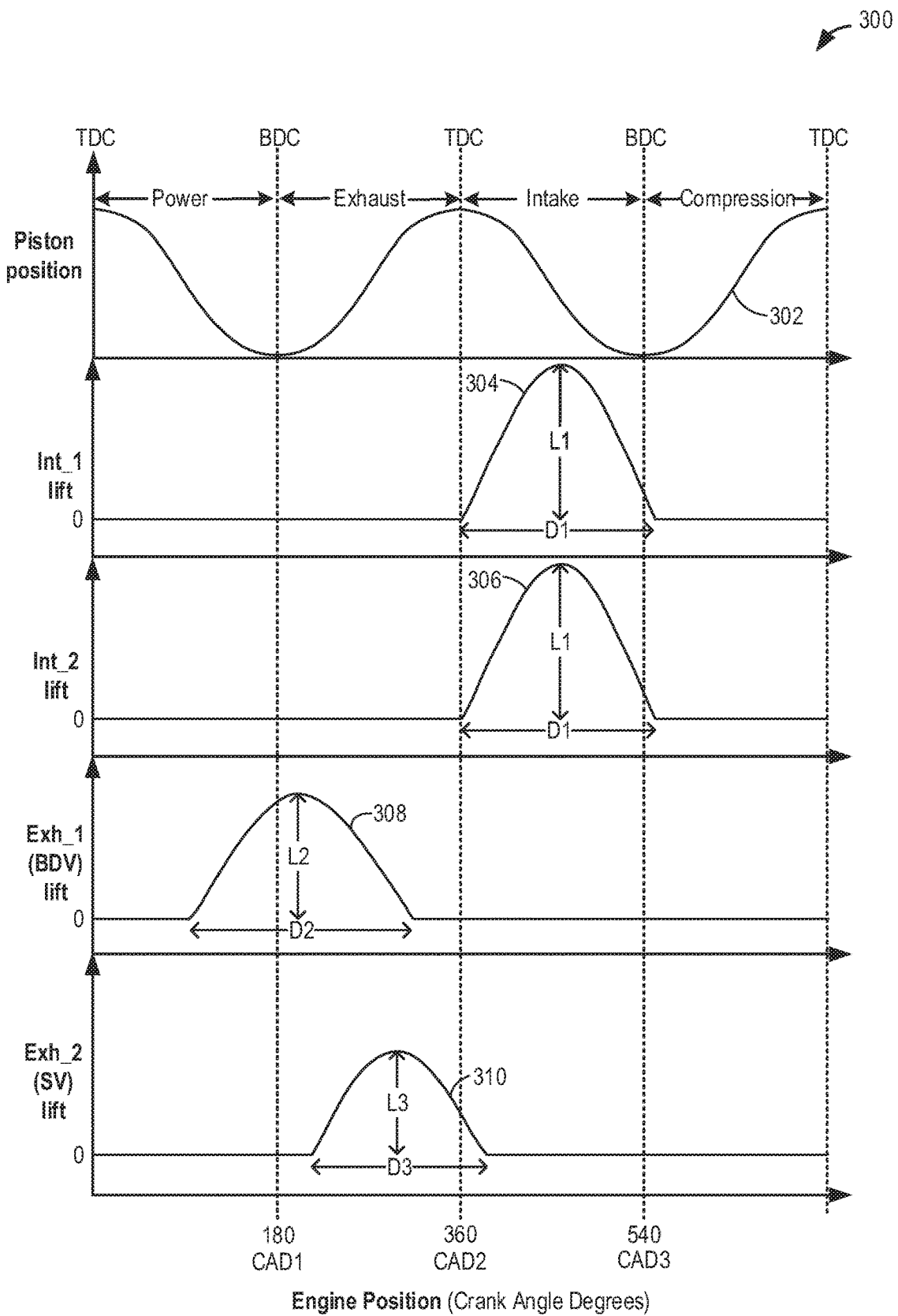
FIG. 3 shows example cylinder intake valve and exhaust valve timings for one engine cylinder of a split exhaust engine system.

The following description relates to systems and methods for operating a split exhaust engine with blowthrough and exhaust gas recirculation (EGR) to an intake via a scavenge manifold and adjusting an amount of directly injected fuel short-circuited via the scavenge manifold. As shown in FIG. 1, the split exhaust engine includes a first exhaust manifold (referred to herein as a blowdown manifold) coupled exclusively to a blowdown exhaust valve of each cylinder and a second exhaust manifold (referred to herein as a scavenge manifold) coupled exclusively to a scavenge exhaust valve of each cylinder. The scavenge manifold is coupled to the intake passage, upstream of a turbocharger compressor, via an EGR passage. In some embodiments, the split exhaust engine system may include additional passages coupled between the scavenge manifold and either the intake or exhaust passage, as shown in FIG. 1. Additionally, in some embodiments, the split exhaust engine system may include various valve actuation mechanisms and may be installed in a hybrid vehicle, as shown in FIG. 2. The scavenge exhaust valves and blowdown exhaust valves open and close at different times in an engine cycle, for each cylinder, in order to isolate scavenge and blowdown portions of combusted exhaust gases and direct these portions separately to the scavenge manifold and blowdown manifold. As shown in FIG. 3, an overlap period may exist between the intake valves and the scavenge exhaust valve of each cylinder where these valves are open at the same time. As a result, fresh, blowthrough air may flow into the EGR passage via the scavenge exhaust valve. Thus, during each engine cycle, the scavenge manifold may receive a combination of combusted exhaust gases, blowthrough air, and unburnt fuel, as schematically illustrated in FIGS. 4A-4D, and recirculate these combined gases to the intake passage via the EGR passage. Further, an amount of unburnt fuel in intake ports at intake valve closing or in the scavenge manifold at second exhaust valve closing for different direct fuel injection start of injection timings is shown in FIGS. 5 and 6, respectively. Therefore, a controller may adjust the start of injection timing in order to adjust the amount unburnt fuel in the scavenge manifold at the second exhaust valve closing, such as according to the example method of FIG. 7, based on engine operating conditions. An example of adjusting the start of injection timing responsive to engine operating conditions is shown in FIG. 8.

Turning now to the figures, FIG. 1 shows a schematic diagram of an engine system including a multi-cylinder internal combustion engine 10, which may be included in a propulsion system of a vehicle 100. Engine 10 includes a plurality of combustion chambers (e.g., cylinders), which may be capped on the top by a cylinder head. In the example shown in FIG. 1, engine 10 includes cylinders 13, 14, 15, and 18, arranged in an inline-4 configuration. Cylinders 14 and 15 are referred to herein as the inner (or inside) cylinders, and cylinders 13 and 18 are referred to herein as the outer (or outside) cylinders. However, it should be understood that although FIG. 1 shows four cylinders, engine 10 may include any number of cylinders in any configuration, e.g., V-6, I-6, V-12, opposed 4, etc. Further, the cylinders shown in FIG. 1 may have a cylinder configuration, such as the cylinder configuration shown in FIG. 2, as will be further described below.

Each of cylinders 13, 14, 15, and 18 include two intake valves, including a first intake valve 2 and a second intake valve 4, and two exhaust valves, including a first exhaust valve (referred to herein as a blowdown exhaust valve, or blowdown valve) 8 and a second exhaust valve (referred to herein as a scavenge exhaust valve, or scavenge valve) 6. The intake valves and exhaust valves may be referred to herein as cylinder intake valves and cylinder exhaust valves, respectively. As explained below with reference to FIG. 2, a timing (e.g., opening timing, closing timing, opening duration, etc.) of each of the intake valves may be controlled via various camshaft timing systems. In one example, both of the first intake valves 2 and the second intake valves 4 may be controlled to a same valve timing, such that they open and close at the same time in the engine cycle. In an alternative example, the first intake valves 2 and the second intake valves 4 may be controlled at a different valve timing. Further, the first exhaust valves 8 may be controlled at a different valve timing than the second exhaust valves 6, such that the first exhaust valve and the second exhaust valve of a same cylinder open and close at different times than one another and the intake valves, as further discussed below.

Each cylinder receives intake air (or a mixture of intake air and recirculated exhaust gas, as will be elaborated below) from an intake manifold 44 via an air intake passage 28. Intake manifold 44 is coupled to the cylinders via intake ports (e.g., runners). For example, intake manifold 44 is shown coupled to each first intake valve 2 of each cylinder via a first intake port 20. Further, intake manifold 44 is coupled to each second intake valve 4 of each cylinder via a second intake port 22. In this way, each cylinder intake port can selectively communicate with the cylinder it is coupled to via a corresponding one of the first intake valves 2 or second intake valves 4. Each intake port may supply air, recirculated exhaust gas, and/or fuel to the cylinder it is coupled to for combustion.

One or more of the intake ports may include a charge motion control device, such as a charge motion control valve (CMCV). As shown in FIG. 1, each first intake port 20 of each cylinder includes a CMCV 24. CMCVs 24 may also be referred to as swirl control valves or tumble control valves. CMCVs 24 may restrict airflow entering the cylinders via first intake valves 2. In the example of FIG. 1, each CMCV 24 may include a valve plate; however, other configurations of the valve are possible. Note that for the purposes of this disclosure, the CMCV 24 is in the "closed" (e.g., fully closed) position when it is fully activated and the valve plate is fully tilted into the respective first intake port 20, thereby resulting in maximum air charge flow obstruction. Alternatively, the CMCV 24 is in the "open" (e.g., fully open) position when deactivated and the valve plate is fully rotated to lie substantially parallel with airflow, thereby considerably minimizing or eliminating airflow charge obstruction. The CMCVs may be principally maintained in their "open" position and may only be activated "closed" when swirl conditions are desired. As shown in FIG. 1, only one intake port of each cylinder includes CMCV 24. However, in other examples, both intake ports of each cylinder may include a CMCV 24. A controller 12 may actuate CMCVs 24 (e.g., via a valve actuator that may be coupled to a rotating shaft directly coupled to each CMCV 24) to move the CMCVs into the open or closed positions, or a plurality of positions between the open and closed positions, in response to engine operating conditions (such as engine speed/load and/or when blowthrough via the second exhaust valves 6 is active. As referred to herein, blowthrough air or blowthrough combustion cooling (BTCC) may refer to intake air that flows from the one or more intake valves of each cylinder to second exhaust valves 6 during a valve opening overlap period between the intake valves and second exhaust valves 6 (e.g., a period when both the intake valves and second exhaust valves 6 are open at the same time), without combusting the blowthrough air.

A high pressure, dual stage fuel system (such as the fuel system shown in FIG. 2) may be used to generate fuel pressures at a fuel injector 66 coupled to each cylinder. As such, fuel may be directly injected into the cylinders via fuel injectors 66. A distributorless ignition system 88 provides an ignition spark to cylinders 13, 14, 15, and 18 via spark plugs 92 in response to a signal from controller 12 to initiate combustion.

Cylinders 13, 14, 15, and 18 are each coupled to two exhaust ports for channeling blowdown and scavenging portions of the combustion gases separately via a split exhaust system. Specifically, as shown in FIG. 1, cylinders 14 and 15 exhaust a first, blowdown portion of the combustion gases to a first manifold portion 81 of a first exhaust manifold (also referred to herein as a blowdown manifold) 84 via first exhaust ports (e.g., runners) 86 and a second, scavenging portion of the combustion gases to a second exhaust manifold (also referred to herein as a scavenge manifold) 80 via second exhaust ports (e.g., runners) 82. Cylinders 13 and 18 exhaust the first blowdown portion of the combustion gases to a second manifold portion 85 of first exhaust manifold 84 via first exhaust ports 86 and the second, scavenging portion to second exhaust manifold 80 via second exhaust ports 82. That is, first exhaust ports 86 of cylinders 13 and 18 extend from cylinders 13 and 18 to the second manifold portion 85 of first exhaust manifold 84, whereas first exhaust ports 86 of cylinders 14 and 15 extend from cylinders 14 and 15 to the first manifold portion 81 of first exhaust manifold 84. Second exhaust ports 82 extend from cylinders 13, 14, 15, and 18 to second exhaust manifold 80.

Each exhaust port can selectively communicate with the cylinder it is coupled to via the corresponding exhaust valve. For example, second exhaust ports 82 communicate with their respective cylinders via second exhaust valves 6, and first exhaust ports 86 communicate with their respective cylinders via first exhaust valves 8. Second exhaust ports 82 are isolated from first exhaust ports 86 when at least one exhaust valve of each cylinder is in a closed position. Exhaust gases may not flow directly between second exhaust ports 82 and first exhaust ports 86. The exhaust system described above may be referred to herein as a split exhaust system, where a first portion of exhaust gases from each cylinder are output to first exhaust manifold 84 and a second portion of exhaust gases from each cylinder are output to second exhaust manifold 80, and where the first and second exhaust manifolds do not directly communicate with one another (e.g., no passage directly couples the two exhaust manifolds to one another, and thus the first and second portions of exhaust gases do not mix with one another within the first and second exhaust manifolds).

Engine 10 includes a turbocharger including a dual-stage exhaust turbine 164 and an intake compressor 162 coupled on a common shaft (not shown). Dual-stage turbine 164 includes a first turbine 163 and a second turbine 165. First turbine 163 is directly coupled to first manifold portion 81 of first exhaust manifold 84 and receives exhaust gases only from cylinders 14 and 15 via first exhaust valves 8 of cylinders 14 and 15. Second turbine 165 is directly coupled to second manifold portion 85 of first exhaust manifold 84 and receives exhaust gases only from cylinders 13 and 18 via first exhaust valves 8 of cylinders 13 and 18. Rotation of the first and second turbines drives rotation of compressor 162, disposed within the intake passage 28. As such, the intake air becomes boosted (e.g., pressurized) at the compressor 162 and travels downstream to intake manifold 44.

Exhaust gases exit both first turbine 163 and second turbine 165 into a common exhaust passage 74. A wastegate may be coupled across the dual-stage turbine 164. Specifically, wastegate valve 76 may be included in a bypass 78 coupled between each of the first manifold portion 81 and second manifold portion 85, upstream of an inlet to dual-stage turbine 164, and exhaust passage 74, downstream of an outlet of dual-stage turbine 164. In this way, a position of wastegate valve 76 controls an amount of boost provided by the turbocharger. For example, as an opening of wastegate valve 76 increases, an amount of exhaust gas flowing through bypass 78 and not through dual-stage turbine 164 may increase, thereby decreasing an amount of power available for driving dual-stage turbine 164 and compressor 162. As another example, as the opening of wastegate valve 76 decreases, the amount of exhaust gas flowing through bypass 78 decreases, thereby increasing the amount of power available for driving dual-stage turbine 164 and compressor 162. In alternative examples, engine 10 may include a single stage turbine where all exhaust gases from the first exhaust manifold 84 are directed to an inlet of a same turbine.

After exiting dual-stage turbine 164, exhaust gases flow downstream in exhaust passage 74 to a first emission control device 70 and a second emission control device 72, second emission control device 72 arranged downstream in exhaust passage 74 from first emission control device 70. Emission control devices 70 and 72 may include one or more catalyst bricks, in one example. In some examples, emission control devices 70 and 72 may be three-way catalysts. In other examples, emission control devices 70 and 72 may include one or a plurality of a diesel oxidation catalyst (DOC) and a selective catalytic reduction catalyst (SCR). In yet another example, second emission control device 72 may include a gasoline particulate filter (GPF). In one example, first emission control device 70 may include a catalyst and second emission control device 72 may include a GPF. After passing through emission control devices 70 and 72, exhaust gases may be directed out to a tailpipe.

Exhaust passage 74 further includes a plurality of exhaust sensors in electronic communication with controller 12, which is included in a control system 17, as will be further described below. As shown in FIG. 1, exhaust passage 74 includes a first oxygen sensor 90 positioned between first emission control device 70 and second emission control device 72. First oxygen sensor 90 may be configured to measure an oxygen content of exhaust gas entering second emission control device 72. Exhaust passage 74 may include one or more additional oxygen sensors positioned along exhaust passage 74, such as a second oxygen sensor 91 positioned between dual-stage turbine 164 and first emission control device 70 and/or a third oxygen sensor 93 positioned downstream of second emission control device 72. As such, second oxygen sensor 91 may be configured to measure the oxygen content of the exhaust gas entering first emission control device 70, and third oxygen sensor 93 may be configured to measure the oxygen content of exhaust gas exiting second emission control device 72. In one example, one or more of oxygen sensor 90, oxygen sensor 91, and oxygen sensor 93 may be universal exhaust gas oxygen (UEGO) sensors. Alternatively, a two-state exhaust gas oxygen sensor may be substituted for one or more of oxygen sensors 90, 91, and 93. Exhaust passage 74 may include various other sensors, such as one or more temperature and/or pressure sensors. For example, as shown in FIG. 1, a sensor 96 is positioned within exhaust passage 74 between first emission control device 70 and second emission control device 72. Sensor 96 may be a pressure and/or temperature sensor. As such, sensor 96 may be configured to measure the pressure and/or temperature of exhaust gas entering second emission control device 72.

Both sensor 96 and oxygen sensor 90 are arranged within exhaust passage 74 at a point where a flow passage 98 couples to exhaust passage 74. Flow passage 98 may be referred to herein as a scavenge manifold bypass passage (SMBP) 98. Scavenge manifold bypass passage 98 is directly coupled to and between second exhaust (e.g., scavenge) manifold 80 and exhaust passage 74. A valve 97 (referred to herein as a scavenge manifold bypass valve, SMBV) is disposed within scavenge manifold bypass passage 98 and is actuatable by controller 12 to adjust an amount of exhaust flow from second exhaust manifold 80 to exhaust passage 74, at a location between first emission control device 70 and second emission control device 72.

Second exhaust manifold 80 is directly coupled to a first exhaust gas recirculation (EGR) passage 50. First EGR passage 50 is a coupled directly between second exhaust manifold 80 and intake passage 28, upstream of compressor 162 (and thus, first EGR passage 50 may be referred to as a low-pressure EGR passage). As such, exhaust gases (or blowthrough air, as explained further below) is directed from second exhaust manifold 80 to air intake passage 28, upstream of compressor 162, via first EGR passage 50. As shown in FIG. 1, first EGR passage 50 may include an EGR cooler 52 configured to cool exhaust gases flowing from second exhaust manifold 80 to intake passage 28 and may further include a first EGR valve 54 (which may be referred to herein as a BTCC valve) disposed therein. Controller 12 is configured to actuate and adjust a position of BTCC valve 54 in order to control a flow rate and/or amount through first EGR passage 50. When the BTCC valve 54 is in a closed (e.g., fully closed) position, no exhaust gases or intake air may flow from second exhaust manifold 80 to intake passage 28, upstream of compressor 162. Further, when the BTCC valve 54 is in an open position (e.g., from partially open to fully open), exhaust gases and/or blowthrough air may flow from second exhaust manifold 80 to intake passage 28, upstream of compressor 162. Controller 12 may additionally adjust the BTCC valve 54 into a plurality of positions between fully open and fully closed. In other examples, controller 12 may only adjust BTCC valve 54 to be either fully open or fully closed. Further, a pressure sensor 53 may be arranged in EGR passage 50 upstream of BTCC valve 54.

A first ejector 56 is positioned at an outlet of EGR passage 50, within intake passage 28. First ejector 56 may include a constriction or venturi that provides a pressure increase at the inlet of compressor 162. As a result, EGR from EGR passage 50 may be mixed with fresh air flowing through intake passage 28 to compressor 162. Thus, EGR from EGR passage 50 may act as the motive flow on first ejector 56. In an alternative example, there may not be an ejector positioned at the outlet of EGR passage 50. Instead, an outlet of compressor 162 may be shaped as an ejector that lowers the gas pressure to assist in EGR flow (and thus, in this example, air is the motive flow and EGR is the secondary flow). In yet another example, EGR from EGR passage 50 may be introduced at a trailing edge of a blade of compressor 162, thereby allowing blowthrough air to be delivered to intake passage 28 via EGR passage 50. An intake pressure sensor 51 may be arranged immediately upstream of the venturi of first ejector 56.

A second EGR passage 58 is coupled between first EGR passage 50 and intake passage 28. Specifically, as shown in FIG. 1, second EGR passage 58 is coupled to first EGR passage 50 between BTCC valve 54 and EGR cooler 52. In other examples, when second EGR passage 58 is included in the engine system, the system may not include EGR cooler 52. Additionally, second EGR passage 58 is directly coupled to intake passage 28, downstream of compressor 162. Further, as shown in FIG. 1, second EGR passage 58 is coupled to intake passage 28 upstream of a charge air cooler (CAC) 40. CAC 40 is configured to cool intake air (which may be a mixture of fresh intake air from outside of the engine system and recirculated exhaust gases) as it passes through CAC 40. As such, recirculated exhaust gases from first EGR passage 50 and/or second EGR passage 58 may be cooled via CAC 40 before entering intake manifold 44. In an alternative example, second EGR passage 58 may be coupled to intake passage 28 downstream of CAC 40. In such an example, there may be no EGR cooler 52 disposed within first EGR passage 50. Further, as shown in FIG. 1, a second ejector 57 may be positioned within intake passage 28 at an outlet of second EGR passage 58.

A second (e.g., mid-pressure) EGR valve 59 is disposed within second EGR passage 58. Second EGR valve 59 is configured to adjust an amount of gas flow (e.g., blowthrough air and/or exhaust) through second EGR passage 58. As further described below, controller 12 may actuate EGR valve 59 into an open (e.g., fully open) position (allowing minimally restricted flow thorough second EGR passage 58), a closed (e.g., fully closed) position (blocking flow through second EGR passage 58), or plurality of positions between fully open and fully closed based on (e.g., as a function of) engine operating conditions. For example, actuating EGR valve 59 may include controller 12 sending an electronic signal to an actuator of EGR valve 59 to move a valve plate of EGR valve 59 into the open position, the closed position, or some position between fully open and fully closed. Based on system pressures and positions of various other valves in the engine system, air may either flow toward intake passage 28 within second EGR passage 58 or toward second exhaust manifold 80 within second EGR passage 58.

Intake passage 28 further includes an intake throttle 62. As shown in FIG. 1, intake throttle 62 is positioned downstream of CAC 40. A position of a throttle plate 64 of throttle 62 may be adjusted by controller 12 via a throttle actuator (not shown) communicatively coupled to controller 12. By modulating intake throttle 62 while operating compressor 162, a desired amount of fresh air and/or recirculated exhaust gas may be cooled by CAC 40 and delivered to the engine cylinders at a boosted pressure via intake manifold 44.

To reduce compressor surge, at least a portion of the air charge compressed by compressor 162 may be recirculated to the compressor inlet. A compressor recirculation passage 41 may be provided for recirculating compressed air from the compressor outlet, upstream of CAC 40, to the compressor inlet. A compressor recirculation valve (CRV) 42 may be provided for adjusting an amount of recirculation flow recirculated to the compressor inlet. In one example, CRV 42 may be actuated open via a command from controller 12 in response to actual or expected compressor surge conditions.

A third flow passage 30 (which may be referred to herein as a hot pipe) is coupled between second exhaust manifold 80 and intake passage 28. Specifically, a first end of third flow passage 30 is directly coupled to second exhaust manifold 80, and a second end of third flow passage 30 is directly coupled to intake passage 28, downstream of intake throttle 62 and upstream of intake manifold 44. A third valve 32 (e.g., a hot pipe valve) is disposed within third flow passage 30 and is configured to adjust an amount of air flow through third flow passage 30. Third valve 32 may be actuated into a fully open position, a fully closed position, or a plurality of positions between fully open and fully closed in response to an actuation signal sent to an actuator of third valve 32 from controller 12.

Second exhaust manifold 80 and/or second exhaust runners 82 may include one or more sensors (such as pressure, oxygen, and/or temperature sensors) disposed therein. For example, as shown in FIG. 1, second exhaust manifold 80 includes a pressure sensor 34 and oxygen sensor 36 disposed therein and configured to measure a pressure and oxygen content, respectively, of exhaust gases and blowthrough (e.g., intake) air exiting second exhaust valves 6 and entering second exhaust manifold 80. Additionally or alternatively to oxygen sensor 36, each second exhaust runner 82 may include an individual oxygen sensor 38 disposed therein. As such, an oxygen content of exhaust gases and/or blowthrough air exiting each cylinder via second exhaust valves 6 may be determined based on an output of oxygen sensors 38 and/or oxygen sensor 36.

In some examples, as shown in FIG. 1, intake passage 28 may include an electric compressor 60. Electric compressor 60 is disposed in a bypass passage 61, which is coupled to intake passage 28 upstream and downstream of an electric compressor valve 63. Specifically, an inlet to bypass passage 61 is coupled to intake passage 28 upstream of electric compressor valve 63, and an outlet to bypass passage 61 is coupled to intake passage 28 downstream of electric compressor valve 63 and upstream of where first EGR passage 50 couples to intake passage 28. Further, the outlet of bypass passage 61 is coupled upstream in intake passage 28 from turbocharger compressor 162. Electric compressor 60 may be electrically driven by an electric motor using energy stored at an energy storage device. In one example, the electric motor may be part of electric compressor 60, as shown in FIG. 1. When additional boost (e.g., increased pressure of the intake air above atmospheric pressure) is requested over an amount provided by compressor 162, controller 12 may activate electric compressor 60 such that it rotates and increases a pressure of intake air flowing through bypass passage 61. Further, controller 12 may actuate electric compressor valve 63 into a closed or partially closed position to direct an increased amount of intake air through bypass passage 61 and electric compressor 60.

Intake passage 28 may include one or more additional sensors (such as additional pressure, temperature, flow rate, and/or oxygen sensors). For example, as shown in FIG. 1, intake passage 28 includes a mass air flow (MAF) sensor 48 disposed upstream of electric compressor valve 63 in intake passage 28. An intake pressure sensor 31 and an intake temperature sensor 33 are positioned in intake passage 28 upstream of compressor 162 and downstream of where first EGR passage 50 couples to intake passage 28. An intake oxygen sensor 35 may be located in intake passage 28 downstream of compressor 162 and upstream of CAC 40. An additional intake pressure sensor 37 may be positioned in intake passage 28 downstream of CAC 40 and upstream of throttle 62. In some examples, as shown in FIG. 1, an additional intake oxygen sensor 39 may be positioned in intake passage 28 between CAC 40 and throttle 62. Further, an intake manifold pressure (e.g., MAP) sensor 122 and an intake manifold temperature sensor 123 are positioned within intake manifold 44, upstream of the engine cylinders.

In some examples, engine 10 may be coupled to an electric motor/battery system (as shown in FIG. 2) in a hybrid vehicle. The hybrid vehicle may have a parallel configuration, a series configuration, or variations or combinations thereof. Further, in some examples, other engine configurations may be employed, for example a diesel engine.

Engine 10 may be controlled at least partially by control system 17, including controller 12, and by input from a vehicle operator via an input device (not shown in FIG. 1). Control system 17 is shown receiving information from a plurality of sensors 16 (various examples of which are described herein) and sending control signals to a plurality of actuators 83. As one example, sensors 16 may include the pressure, temperature, and oxygen sensors located within intake passage 28, intake manifold 44, exhaust passage 74, and second exhaust manifold 80 described above. Other sensors may include a throttle inlet temperature sensor for estimating a throttle air temperature (TCT) coupled downstream of throttle 62 in the intake passage. Additional system sensors and actuators are elaborated below with reference to FIG. 2. As another example, actuators 83 may include fuel injectors 66, valves 63, 42, 54, 59, 32, 97, 76, and throttle 62. Actuators 83 may further include various camshaft timing actuators coupled to the cylinder intake and exhaust valves (as described below with reference to FIG. 2). Controller 12 may receive input data from the various sensors, process the input data, and trigger the actuators in response to the processed input data based on instruction or code programmed in a memory of controller 12 corresponding to one or more routines. An example control routine (e.g., method) is described herein at FIG. 7. For example, a start of injection timing of a fuel direct injection may be timed for a desired gas flow through second exhaust valve 6 in order to increase or decrease fuel scavenging based on engine operating conditions.

It should be noted that while FIG. 1 shows engine 10 including each of first EGR passage 50, second EGR passage 58, flow passage 98, and flow passage 30, in other examples, engine 10 may only include a portion of these passages. For example, engine 10 may only include first EGR passage 50 and flow passage 98 and not include second EGR passage 58 and flow passage 30. In another example, engine 10 may include first EGR passage 50, second EGR passage 58, and flow passage 98, but not include flow passage 30. In yet another example, engine 10 may include first EGR passage 50, flow passage 30, and flow passage 98, but not second EGR passage 58. In some examples, engine 10 may not include electric compressor 60. In still other examples, engine 10 may include all or only a portion of the sensors shown in FIG. 1.

Referring now to FIG. 2, a partial view of a single cylinder of internal combustion engine 10 is shown. As such, components previously introduced in FIG. 1 are represented with the same reference numbers and are not re-introduced. Engine 10 is depicted with combustion chamber (cylinder) 130, which may represent any of cylinders 13, 14, 15, and 18 of FIG. 1. Combustion chamber 130 includes a coolant sleeve 114 and cylinder walls 132, with a piston 136 positioned therein and connected to a crankshaft 140. Combustion chamber 130 is shown communicating with intake manifold 44 and first exhaust port 86 via intake valve 4 and first exhaust valve 8, respectively. As previously described in FIG. 1, each cylinder of engine 10 may exhaust combustion products along two conduits, and only the first exhaust port (e.g., runner) leading from the cylinder to the turbine is shown in FIG. 2, while the second exhaust port (e.g., second exhaust port 82) is not visible in this view.

As also previously elaborated in FIG. 1, each cylinder of engine 10 may include two intake valves and two exhaust valves. In the depicted view, only one intake valve (e.g., intake valve 4) and first exhaust valve 8 are shown. Intake valve 4 and first exhaust valve 8 are located at an upper region of combustion chamber 130. Intake valve 4 and first exhaust valve 8 may be controlled by controller 12 using respective cam actuation systems including one or more cams. The cam actuation systems may utilize one or more of cam profile switching (CPS), variable cam timing (VCT), variable valve timing (VVT), and/or variable valve lift (VVL) systems to vary valve operation. In the depicted example, each intake valve, including intake valve 4, is controlled by an intake cam 151, and each exhaust valve, including first exhaust valve 8, is controlled by an exhaust cam 153. The intake cam 151 may be actuated via an intake valve timing actuator 101 and the exhaust cam 153 may be actuated via an exhaust valve timing actuator 103 according to set intake and exhaust valve timings, respectively. In some examples, the intake valves and exhaust valves may be deactivated via the intake valve timing actuator 101 and exhaust valve timing actuator 103, respectively. For example, the controller may send a signal to the exhaust valve timing actuator 103 to deactivate the first exhaust valve 8 such that it remains closed and does not open at its set timing. The position of intake camshaft 151 and exhaust camshaft 153 may be determined by camshaft position sensors 155 and 157, respectively. As introduced above, in one example, all exhaust valves of every cylinder may be controlled on a same exhaust camshaft. As such, a timing of both of the scavenge (second) exhaust valve and the blowdown (first) exhaust valve may be adjusted together via one camshaft, but they may each have different timings relative to one another. In another example, the blowdown exhaust valve of every cylinder may be controlled via a first exhaust camshaft, and a scavenge exhaust valve of every cylinder may be controlled on via different, second exhaust camshaft. In this way, the valve timing of the scavenge valves and blowdown valves may be adjusted separately from one another. In alternative examples, the cam or valve timing system(s) of the scavenge and/or blowdown exhaust valves may employ a cam in cam system, an electrohydraulic-type system on the scavenge valves, and/or an electro-mechanical valve lift control on the scavenge valves.

In some examples, the intake and/or exhaust valves may be controlled by electric valve actuation. For example, cylinder 130 may alternatively include an intake valve controlled via electric valve actuation and an exhaust valve controlled via cam actuation, including CPS and/or VCT systems. In still other examples, the intake and exhaust valves may be controlled by a common valve actuator or actuation system or a variable valve timing actuator or actuation system.

In one example, intake cam 151 includes separate and different cam lobes that provide different valve profiles (e.g., valve timing, valve lift, duration, etc.) for each of the two intake valves of combustion chamber 130. Likewise, exhaust cam 153 may include separate and different cam lobes that provide different valve profiles (e.g., valve timing, valve lift, duration, etc.) for each of the two exhaust valves of combustion chamber 130. In another example, intake cam 151 may include a common lobe, or similar lobes, that provide a substantially similar valve profile for each of the two intake valves.

In addition, different cam profiles for the different exhaust valves can be used to separate exhaust gases exhausted at lower cylinder pressures from exhaust gases exhausted at higher cylinder pressures. For example, a first exhaust cam profile can open the first exhaust valve (e.g., blowdown valve) from a closed position just before bottom dead center (BDC) of the power stroke of combustion chamber 130 and close the same exhaust valve well before top dead center (TDC) of the exhaust stroke to selectively exhaust blowdown gases from the combustion chamber. Further, a second exhaust cam profile can be used to open the second exhaust valve (e.g., scavenge valve) from a closed position before a mid-point of the exhaust stroke and close it after TDC to selectively exhaust the scavenging portion of the exhaust gases. Example valve timings will be described below with respect to FIG. 3.

Thus, the timing of the first exhaust valve and the second exhaust valve can isolate cylinder blowdown gases from a scavenging portion of exhaust gases while any residual exhaust gases in the clearance volume of the cylinder can be cleaned out with fresh intake air blowthrough during positive valve overlap between the intake valve and the scavenge exhaust valves. By flowing a first portion of the exhaust gas leaving the cylinders (e.g., higher pressure exhaust) to the turbine (e.g., turbine 165 introduced in FIG. 1) and a higher pressure exhaust passage and flowing a later, second portion of the exhaust gas (e.g., lower pressure exhaust) and blowthrough air to the compressor inlet (e.g., an inlet of compressor 162 introduced in FIG. 1), the engine system efficiency may be increased.

Cylinder 130 can have a compression ratio, which is a ratio of volumes when piston 136 is at bottom dead center to top dead center. Conventionally, the compression ratio is in a range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include spark plug 92 for initiating combustion. Ignition system 88 can provide an ignition spark to combustion chamber 130 via spark plug 92 in response to a spark advance signal SA from controller 12, under select operating modes. However, in some examples, spark plug 92 may be omitted, such as where engine 10 initiates combustion by auto-ignition or by injection of fuel, such as when engine 10 is a diesel engine.

As a non-limiting example, cylinder 130 is shown including one fuel injector 66. Fuel injector 66 is shown coupled directly to combustion chamber 130 for injecting fuel directly therein in proportion to a pulse width of a signal FPW received from controller 12 via an electronic driver 168. In this manner, fuel injector 66 provides what is known as direct injection (hereafter also referred to as "DI") of fuel into cylinder 130. While FIG. 2 shows injector 66 as a side injector, it may also be located overhead of the piston, such as near the position of spark plug 92. Such a position may increase mixing and combustion when operating the engine with an alcohol-based fuel due to the lower volatility of some alcohol-based fuels. Alternatively, the injector may be located overhead and near the intake valve to improve mixing. In another example, injector 66 may be a port injector providing fuel into the intake port upstream of cylinder 130.

Fuel may be delivered to fuel injector 66 from a high pressure fuel system 180 including one or more fuel tanks, fuel pumps, and a fuel rail. Alternatively, fuel may be delivered by a single stage fuel pump at a lower pressure. Further, while not shown, the fuel tanks may include a pressure transducer providing a signal to controller 12. Fuel tanks in fuel system 180 may hold fuel with different fuel qualities, such as different fuel compositions. These differences may include different alcohol content, different octane, different heats of vaporization, different fuel blends, and/or combinations thereof, etc. In some examples, fuel system 180 may be coupled to a fuel vapor recovery system including a canister for storing refueling and diurnal fuel vapors. The fuel vapors may be purged from the canister to the engine cylinders during engine operation when purge conditions are met.

Engine 10 may be controlled at least partially by controller 12 and by input from a vehicle operator 113 via an accelerator pedal 116 and an accelerator pedal position sensor 118 and via a brake pedal 117 and a brake pedal position sensor 119. The accelerator pedal position sensor 118 may send a pedal position signal (PP) to controller 12 corresponding to a position of accelerator pedal 116, and the brake pedal position sensor 119 may send a brake pedal position (BPP) signal to controller 12 corresponding to a position of brake pedal 117. Controller 12 is shown in FIG. 3 as a microcomputer, including a microprocessor unit 102, input/output ports 104, an electronic storage medium for executable programs and calibration values shown as a read only memory 106 in this particular example, random access memory 108, keep alive memory 110, and a data bus. Storage medium read-only memory 106 can be programmed with computer readable data representing instructions executable by microprocessor 102 for performing the methods and routines described below as well as other variants that are anticipated but not specifically listed. Controller 12 may receive various signals from sensors coupled to engine 10, in addition to those signals previously discussed, including a measurement of inducted mass air flow (MAF) from mass air flow sensor 48, an engine coolant temperature signal (ECT) from a temperature sensor 112 coupled to coolant sleeve 114, a profile ignition pickup signal (PIP) from a Hall effect sensor 120 (or other type) coupled to crankshaft 140, a throttle position (TP) from a throttle position sensor coupled to throttle 62, and an absolute manifold pressure signal (MAP) from MAP sensor 122. An engine speed signal, RPM, may be generated by controller 12 from signal PIP. The manifold pressure signal MAP from the manifold pressure sensor may be used to provide an indication of vacuum or pressure in the intake manifold.

Based on input from one or more of the above-mentioned sensors, controller 12 may adjust one or more actuators, such as fuel injector 66, throttle 62, spark plug 92, intake/exhaust valves and cams, etc. The controller may receive input data from the various sensors, process the input data, and trigger the actuators in response to the processed input data based on instruction or code programmed therein corresponding to one or more routines, an example of which is described with respect to FIG. 7.

In some examples, the vehicle may be a hybrid vehicle with multiple sources of torque available to one or more vehicle wheels 160. In other examples, the vehicle is a conventional vehicle with only an engine. In the example shown in FIG. 2, the vehicle includes engine 10 and an electric machine 161. Electric machine 161 may be a motor or a motor/generator and thus may also be referred to herein as an electric motor. Electric machine 161 receives electrical power from a traction battery 170 to provide torque to vehicle wheels 160. Electric machine 161 may also be operated as a generator to provide electrical power to charge battery 170, for example during a braking operation.

Crankshaft 140 of engine 10 and electric machine 161 are connected via a transmission 167 to vehicle wheels 160 when one or more clutches 166 are engaged. In the depicted example, a first clutch 166 is provided between crankshaft 140 and electric machine 161, and a second clutch 166 is provided between electric machine 161 and transmission 167. Controller 12 may send a signal to an actuator of each clutch 166 to engage or disengage the clutch, so as to connect or disconnect crankshaft 140 from electric machine 161 and the components connected thereto, and/or connect or disconnect electric machine 161 from transmission 167 and the components connected thereto. Transmission 167 may be a gearbox, a planetary gear system, or another type of transmission. The powertrain may be configured in various manners including as a parallel, a series, or a series-parallel hybrid vehicle.

Now turning to FIG. 3, graph 300 depicts example valve timings with respect to a piston position for an engine cylinder comprising four valves: two intake valves and two exhaust valves, such as described above with reference to FIGS. 1 and 2. The cylinder is configured to receive intake air via the two intake valves (e.g., intake valves 2 and 4 introduced in FIG. 1), exhaust a first, blowdown portion of exhaust gas to a turbine inlet via a blowdown exhaust valve (e.g., first, or blowdown, exhaust valve 8 introduced in FIG. 1), exhaust a second, scavenging portion of exhaust gas to an intake passage via a scavenge exhaust valve (e.g., second, or scavenge, exhaust valve 6 introduced in FIG. 1), and provide non-combusted blowthrough air to the intake passage via the scavenge exhaust valve. By adjusting the timing of the opening and/or closing of the scavenge exhaust valve with that of the two intake valves, residual exhaust gases in the cylinder clearance volume may be flushed out and recirculated as EGR along with fresh intake blowthrough air.

Graph 300 illustrates an engine position along the horizontal axis in crank angle degrees (CAD). In the example of FIG. 3, relative differences in timings can be estimated by the drawing dimensions. However, other relative timings may be used, if desired. Plot 302 depicts piston position (along the vertical axis) relative to top dead center (TDC), bottom dead center (BDC), and the four strokes of an engine cycle (intake, compression, power, and exhaust). During the intake stroke, generally, the exhaust valves close and intake valves open. Air is introduced into the cylinder via the intake manifold and the corresponding intake ports, and the piston moves to the bottom of the cylinder so as to increase the volume within the cylinder. The position at which the piston is at its bottom-most position in the cylinder and at the end of its stroke (e.g., when the combustion chamber is at its largest volume) is typically referred to as BDC. During the compression stroke, the intake valves and the exhaust valves are closed. The piston moves toward the cylinder head so as to compress the air within the cylinder. The point at which the piston is at the end of its stroke and closest to the cylinder head (e.g., when the combustion chamber is at its smallest volume) is typically referred to as TDC. In a process herein referred to as injection, fuel is introduced into the combustion chamber. In a process herein referred to as ignition, the injected fuel is ignited, such as via a spark from a spark plug, resulting in combustion. During the expansion stroke, the expanding gases push the piston back down to BDC. A crankshaft (e.g., crankshaft 140 shown in FIG. 2) converts this piston movement into a rotational torque of the rotary shaft. During the exhaust stroke, the exhaust valves are opened to release the combusted air-fuel mixture to the corresponding exhaust passages, and the piston returns to TDC. In this description, the second exhaust (scavenge) valves may be opened after the beginning of the exhaust stroke and may stay open until after the end of the exhaust stroke, while the first exhaust (blowdown) valves are closed and the intake valves are opened to flush out residual exhaust gases with blowthrough air.

Plot 304 depicts an intake valve timing, lift, and duration for a first intake valve (Int_1), while plot 306 depicts an intake valve timing, lift, and duration for a second intake valve (Int_2), both intake valves coupled to the intake passage of the engine cylinder. Plot 308 depicts an example exhaust valve timing, lift, and duration for a blowdown exhaust valve (Exh_1), which may correspond to first (e.g., blowdown) exhaust valve 8 introduced in FIG. 1, coupled to a first exhaust manifold (e.g., blowdown exhaust manifold 84 shown in FIG. 1) of via a first exhaust port (e.g., first exhaust port 86 of FIG. 1). Plot 310 depicts an example exhaust valve timing, lift, and duration for a scavenge exhaust valve (Exh_2), which may correspond to second (e.g., scavenge) exhaust valve 6 shown in FIG. 1, coupled to a scavenge manifold (e.g., scavenge manifold 80 shown in FIG. 1) via a second exhaust port (e.g., second exhaust port 82 of FIG. 1). As previously elaborated, the first exhaust manifold connects (e.g., fluidly couples) the blowdown exhaust valve to the inlet of a turbocharger turbine (e.g., turbine 165 of FIG. 1), and the scavenge manifold connects (e.g., fluidly couples) the scavenge exhaust valve to an intake passage via an EGR passage (e.g., first EGR passage 50 shown in FIG. 1). The first exhaust manifold may be separate from the scavenge manifold, as explained above.

In the depicted example, the first and second intake valves are fully opened from a closed position (e.g., a valve lift of zero) at a common timing (plots 304 and 306), beginning near the intake stroke TDC just after CAD2 (e.g., at or just after the intake stroke TDC), and are closed after a subsequent compression stroke has commenced past CAD3 (e.g., after BDC). Additionally, when opened fully, the two intake valves may be opened with a same amount of valve lift L1 for a same duration of D1. In other examples, the two intake valves may be operated with a different timing by adjusting the phasing, lift, or duration. In contrast to the common timing of the first and second intake valves, the timing of the blowdown exhaust valve opening and closing may be staggered relative to the scavenge exhaust valve opening and closing. Specifically, the blowdown exhaust valve (plot 308) is opened from a closed position at a first timing that is earlier in the engine cycle than the timing at which the scavenge exhaust valve (plot 310) is opened from a closed position. Specifically, the first timing for opening the blowdown exhaust valve is between TDC and BDC of the power stroke, before CAD1 (e.g., before the exhaust stroke BDC), while the timing for opening the scavenge exhaust valve is just after the exhaust stroke BDC, after CAD1 but before CAD2. The blowdown exhaust valve (plot 308) is closed before the end of the exhaust stroke, and the scavenge exhaust valve (plot 310) is closed after the end of the exhaust stroke. Thus, the scavenge exhaust valve remains open to overlap slightly with opening of the intake valves.

To elaborate, the blowdown exhaust valve (plot 308) may be fully opened from close before the start of an exhaust stroke (e.g., between 90 and 30 degrees before BDC, depending on cam phasing), maintained fully open through a first part of the exhaust stroke, and may be fully closed before the exhaust stroke ends (e.g., between 50 and 0 degrees before TDC, depending on cam phasing) to collect the blowdown portion of the exhaust pulse. The scavenge exhaust valve (plot 310) may be fully opened from a closed position just after the beginning of the exhaust stroke (e.g., between 30 and 90 degrees past BDC, depending on cam phasing), maintained open through a second portion of the exhaust stroke, and may be fully closed after the intake stroke begins (e.g., between 20 and 70 degrees after TDC, depending on cam phasing) to exhaust the scavenging portion of the exhaust. Additionally, the scavenge exhaust valve and the intake valves, as shown in FIG. 3, may have a positive overlap phase (e.g., from between 20 degrees before TDC and 30 degrees after TDC until between 30 and 90 degrees past TDC, depending on cam phasing) to allow blowthrough with EGR. This cycle, wherein all four valves are operational, may repeat itself based on engine operating conditions.

Additionally, the blowdown exhaust valve (plot 308) may be opened with a first amount of valve lift L2, while the scavenge exhaust valve (plot 310) may be opened with a second amount of valve lift L3, where L3 is smaller than L2. Further still, the blowdown exhaust valve may be opened at the first timing for a duration D2, while the scavenge exhaust valve may be opened for a duration D3, where D3 is smaller than D2. It will be appreciated that in other examples, the two exhaust valves may have the same amount of valve lift and/or same duration of opening while opening at differently phased timings.

In this way, by using staggered valve timings, engine efficiency and power can be increased by separating exhaust gases released at higher pressure (e.g., expanding blowdown exhaust gases in the cylinder) from residual exhaust gases at low pressure (e.g., exhaust gases that remain in the cylinder after blowdown) into the different manifolds. Further, by conveying low pressure residual exhaust gases as EGR along with blowthrough air to the compressor inlet (via the first EGR passage and the scavenge manifold), combustion chamber temperatures can be lowered, thereby reducing an occurrence of knock and an amount of spark retard from maximum brake torque timing. Further, because the exhaust gases at the end of the exhaust stroke are directed to either downstream of the turbine or upstream of the compressor, which are both at lower pressures, exhaust pumping losses can be minimized to increase engine efficiency.

Thus, exhaust gases can be used more efficiently than simply directing all the exhaust gas of a cylinder through a single, common exhaust port to the turbocharger turbine. As such, several advantages may be achieved. For example, the average exhaust gas pressure supplied to the turbocharger can be increased by separating and directing the blowdown pulse into the turbine inlet to increase turbocharger output. Additionally, fuel economy may be increased because blowthrough air is not routed to the catalyst, being directed to the compressor inlet instead, and therefore, excess fuel may not be injected into the exhaust gases to maintain a stoichiometric air-fuel ratio upstream of the catalyst.

However, a composition of the gas conveyed through the scavenge exhaust valve to the compressor inlet (via the first EGR passage and the scavenge manifold) varies throughout the scavenge exhaust valve open duration and further varies based on operating parameters, such as a duration of the positive overlap phase between the scavenge exhaust valve and the intake valves, relative pressures of the intake manifold and the scavenge manifold, and a timing of a fuel direct injection relative to a closing timing of the scavenge exhaust valve. Therefore, FIGS. 4A-4D schematically illustrate sources of different recirculated gases throughout an open duration of the scavenge exhaust valve. Specifically, a cylinder diagram 400 in each of FIGS. 4A-4D schematically depicts gas flow through the cylinder at an engine position shown in a corresponding valve diagram 450. Components of cylinder diagram 400 that are the same as the components shown in FIGS. 1 and 2 are numbered the same and may not be reintroduced. Valve diagram 450 shows engine position along the horizontal axis (in crank angle degrees after TDC of the intake stroke) and valve lift along the vertical axis (in millimeters). An example valve timing, lift, and duration for a set of intake valves is shown in plot 404 (e.g., intake valves 2 and 4 introduced in FIG. 1 and shown in cylinder diagram 400), an example valve timing, lift, and duration for a first, blowdown exhaust valve is shown in plot 408 (e.g., blowdown exhaust valve 8 introduced in FIG. 1 and shown in cylinder diagram 400), and an example valve timing, lift, and duration for a second, scavenge exhaust valve is shown in plot 410 (e.g., scavenge exhaust valve 6 introduced in FIG. 1 and shown in cylinder diagram 400).

Turning first to FIG. 4A, cylinder diagram 400 shows gas flow through scavenge exhaust valve 6 at a first engine position indicated by a dashed line 416 on valve diagram 450. The first engine position occurs during an exhaust stroke, just before TDC of the intake stroke. Intake valves 2 and 4 are closed at the first engine position, as indicated by black filled circles for intake valves 2 and 4 in cylinder diagram 400 and as shown by plot 404 in valve diagram 450. Blowdown exhaust valve 8 is also substantially closed at the first engine position. Scavenge exhaust valve 6 is open at the first engine position, as indicated by a white filled circle for scavenge exhaust valve 6 in cylinder diagram 400 and as shown by plot 410 in valve diagram 450. With the intake valves closed, residual gases 414 from combustion that have not already exited the cylinder as blowdown exhaust (e.g., via blowdown exhaust valve 8) flow from cylinder 130 through the open scavenge exhaust valve 6 and toward scavenge manifold 80 via second exhaust port 82. Further, with blowdown exhaust valve 8 substantially closed at the first engine position, the residual gases 414 do not flow through the blowdown exhaust valve and toward first exhaust manifold 84 via first exhaust port 86. For example, a blowdown portion of residual gases 414 may have already been exhausted through blowdown exhaust valve 8 earlier in the engine cycle (e.g., at a more negative crank angle with respect to TDC of the intake stroke) while blowdown exhaust valve 8 was open (e.g., as shown in plot 408). Residual gases 414 may be comprised of burnt gases, a mixture of burnt gases and air, and/or a mixture of burnt gases and unburnt fuel injected during the previous engine cycle, for example.

Turning next to FIG. 4B, cylinder diagram 400 shows gas flow through scavenge exhaust valve 6 at a second engine position indicated by a dashed line 418 on valve diagram 450. The second engine position occurs during the intake stroke, shortly after TDC. Intake valves 2 and 4 are open at the second engine position, as indicated by white filled circles for intake valves 2 and 4 in cylinder diagram 400 and as shown by plot 404 in valve diagram 450. Blowdown exhaust valve 8 is fully closed at the second engine position. Scavenge exhaust valve 6 remains open at the second engine position, as indicated by a white filled circle for scavenge exhaust valve 6 in cylinder diagram 400 and as shown by plot 410 in valve diagram 450. With the intake valves open, pushback gases 420 flow from intake ports 20 and 22, though the open intake valves 2 and 4, through cylinder 130, through the open scavenge exhaust valve 6, and toward scavenge manifold 80 via second exhaust port 82. Further, with blowdown exhaust valve 8 fully closed at the second engine position, the pushback gases 420 do not flow through the blowdown exhaust valve and toward first exhaust manifold 84 via first exhaust port 86. Pushback gases 420 may be comprised of a mixture of burnt gases, air, and/or unburnt fuel injected during the previous engine cycle. For example, while intake valves 2 and 4 are open, gas may flow from cylinder 130 to intake ports 20 and 22 based on an in-cylinder pressure and a pressure in the intake ports (e.g., based on MAP) and may remain in the intake ports upon intake valve closing. Further, an amount of unburnt fuel in the pushback gases 420 varies based on an amount of overlap between a start of injection (SOI) of a fuel direct injection and a closing timing of scavenge exhaust valve 6. Then, during a subsequent engine cycle, pushback gases 420 may flow from intake ports 20 and 22 into cylinder 130 upon intake valve opening, and at least a portion of the pushback gases 420 may then flow through scavenge exhaust valve 6 onto scavenge manifold 80.

Turning briefly to FIG. 5, an example graph 500 shows a relationship between a SOI timing of a fuel direct injection during an intake stroke and an amount of fuel in pushback gases. The horizontal axis of graph 500 shows engine position (in crank angle degrees), with 360 crank angle degrees representing TDC of the intake stroke. The vertical axis of graph 500 represents an intake fuel mass (e.g., a mass of fuel in the intake ports), with a magnitude of the fuel mass increasing from bottom to top. Dot-dashed plot 502 shows the mass of fuel in the intake ports at an earlier SOI timing of 391 crank angle degrees, as represented by dot-dashed line 512. Dashed plot 504 shows the mass of fuel in the intake ports at a later SOI timing of 431 crank angle degrees, as represented by dashed line 514. A timing of intake valve opening is shown by dashed line 506 (e.g., at 372 crank angle degrees) and a timing of intake valve closing is shown by dashed line 508 (e.g., at 612 crank angle degrees), with an open duration of the intake valves spanning between the opening timing and the closing timing. Although not shown in graph 500, in the example of FIG. 5, a scavenge exhaust valve opening timing is at 241 crank angle degrees, and a scavenge exhaust valve closing timing is at 421 crank angle degrees.

As shown in graph 500, the earlier SOI timing at 391 crank angle degrees (dot-dashed line 512) results in a higher intake fuel mass (dot-dashed plot 502) than the later SOI timing at 431 crank angle degrees (dashed line 514 and dashed plot 504). As one non-limiting example, at intake valve closing (dashed line 508), the mass of fuel in the intake ports may be approximately 2% higher when the SOI timing overlaps with an open duration of the scavenge exhaust valve by 30 crank angle degrees (dot-dashed plot 502) compared with when the SOI timing occurs 10 crank angle degrees after scavenge exhaust valve closing (dashed plot 504). Relative pressures of a scavenge manifold coupled to the scavenge exhaust valve, intake air density (which depends on manifold charge temperature and manifold absolute pressure), engine speed, intake valve closing timing, a target air-fuel ratio, in-cylinder pressures, a pressure at the intake ports, and spray and fuel mixing dynamics of the fuel direct injection further influence the mass of fuel in the intake ports from pushback gases.

Returning to FIGS. 4A-4D, next, cylinder diagram 400 of FIG. 4C shows gas flow through scavenge exhaust valve 6 at a third engine position indicated by a dashed line 422 on valve diagram 450. Intake valves 2 and 4 are open at the third engine position, as indicated by white filled circles for intake valves 2 and 4 in cylinder diagram 400 and as shown by plot 404 in valve diagram 450. Blowdown exhaust valve 8 is fully closed at the third engine position. Scavenge exhaust valve 6 remains open at the third engine position, as indicated by a white filled circle for scavenge exhaust valve 6 in cylinder diagram 400 and as shown by plot 410 in valve diagram 450. Fuel is directly injected into cylinder 130 via fuel injector 66 at the third engine position. With the scavenge exhaust valve open, short-circuited (e.g., scavenged) fuel 424 from the fuel direct injection flows directly through scavenge exhaust valve 6 and toward scavenge manifold 80 via second exhaust port 82. An amount of the short-circuited fuel 424 varies based on an amount of overlap between the SOI of the fuel direct injection and a closing timing of scavenge exhaust valve 6, an intake-to-scavenge manifold flow, a duration of the positive overlap between intake valves 2 and 4 and scavenge exhaust valve 6, an amount of flow through a scavenge manifold bypass passage (e.g., SMBP 98 shown in FIG. 1), an amount of fuel injected in the fuel direct injection, an end of injection (EOI) timing of the fuel direct injection, and a relative pressure between the scavenge manifold and the intake. That is, a portion of the directly injected fuel may flow through scavenge exhaust valve 6 as short-circuited fuel 242, with the portion varying (relative to a total amount of fuel directly injected) based on pressure and flow characteristics of the scavenge manifold and the intake manifold and the amount of overlap between the direct injection and an open duration of scavenge exhaust valve 6.

Turning briefly to FIG. 6, an example graph 600 shows a relationship between a SOI timing of a fuel direct injection during an intake stroke and an amount of fuel short-circuited to a scavenge manifold via an open scavenge exhaust valve coupled to the scavenge manifold. The horizontal axis of graph 600 shows engine position (in crank angle degrees), with 360 crank angle degrees representing TDC of the intake stroke. The vertical axis of graph 600 represents a scavenge manifold fuel mass (e.g., a mass of fuel in the scavenge manifold), with a magnitude of the fuel mass increasing from bottom to top. Dot-dashed plot 602 shows the mass of fuel in the scavenge manifold at an earlier SOI timing of 391 crank angle degrees, as represented by dot-dashed line 612. Dashed plot 604 shows the mass of fuel in the scavenge manifold at a later SOI timing of 431 crank angle degrees, as represented by dashed line 614. A timing of scavenge (e.g., second) exhaust valve opening is shown by dashed line 606 (e.g., at 241 crank angle degrees), and a timing of scavenge exhaust valve closing is shown by dashed line 608 (e.g., at 421 crank angle degrees), with an open duration of the scavenge exhaust valve spanning between the opening timing and the closing timing. Although not shown in graph 600, in the example of FIG. 6, an opening timing of a set of intake valves is at 372 crank angle degrees, and a closing timing of the intake valves is at 612 crank angle degrees.

As shown in graph 600, the earlier SOI timing at 391 crank angle degrees (dot-dashed line 612) results in a higher scavenge manifold fuel mass (dot-dashed plot 602) than the later SOI timing at 431 crank angle degrees (dashed line 614 and dashed plot 604). As one non-limiting example, a mass of fuel that flows from the cylinder to the scavenge manifold while the scavenge exhaust valve is open may be nearly 1% higher when the SOI timing overlaps with an open duration of the scavenge exhaust valve by 30 crank angle degrees (dot-dashed plot 602) compared with when the SOI timing occurs 10 crank angle degrees after scavenge exhaust valve closing (dashed plot 604). Relative pressures of the scavenge manifold, in-cylinder pressures, a pressure of the intake manifold, fuel rail pressure, split injection fuel fraction, manifold charge temperature, fuel atomization rate, injection geometry and angle, etc. further influence the mass of fuel that flows from the cylinder to the scavenge manifold.

Returning to FIGS. 4A-4D, in FIG. 4D, cylinder diagram 400 shows gas flow through scavenge exhaust valve 6 at a fourth engine position indicated by a dashed line 426 on valve diagram 450. Intake valves 2 and 4 are open at the fourth engine position, as indicated by white filled circles for intake valves 2 and 4 in cylinder diagram 400 and as shown by plot 404 in valve diagram 450. Blowdown exhaust valve 8 is fully closed at the fourth engine position. Scavenge exhaust valve 6 remains open at the fourth engine position, as indicated by a white filled circle for scavenge exhaust valve 6 in cylinder diagram 400 and as shown by plot 410 in valve diagram 450. With the intake valves open, intake manifold gases 428 flow from intake manifold 44, through intake ports 20 and 22 to the open intake valves 2 and 4, through cylinder 130, through the open scavenge exhaust valve 6, and toward scavenge manifold 80 via second exhaust port 82. Further, with blowdown exhaust valve 8 fully closed at the fourth engine position, the intake manifold gases 428 do not flow through the blowdown exhaust valve and toward first exhaust manifold 84 via first exhaust port 86. Intake manifold gases 428 may be comprised of fresh air, recirculated burnt gases (e.g., as recirculated by first EGR passage 50 shown in FIG. 1), and, in some examples, recirculated (unburnt) fuel, for example. For example, fuel scavenged during a first engine cycle may be recirculated through an EGR passage (e.g., first EGR passage 50 shown in FIG. 1) to intake manifold 44. Then, during a second, subsequent engine cycle, the fuel scavenged during the first engine cycle may flow from intake manifold 44 into cylinder 130. In some examples, at least a portion of the fuel scavenged during the first engine cycle may further flow through the open scavenge exhaust valve 6 during the second engine cycle as intake manifold gases 428.

Thus, FIGS. 4A-4D, show different sources of recirculated gases throughout the open duration of the second exhaust valve. The different sources of recirculated gases may supply gases of varying composition, which may further vary based on scavenge valve timing, intake valve timing, fuel injection timing, and pressure and flow characteristics. A timing of a fuel direct injection relative to a scavenge valve closing timing affects an amount of fuel in pushback gases (illustrated in FIG. 5) and short-circuited to the scavenge manifold (illustrated in FIG. 6). Specifically, by adjusting the timing of the fuel direct injection relative to the scavenging valve closing timing, the amount of short-circuited fuel may be controlled.

Figure 7:
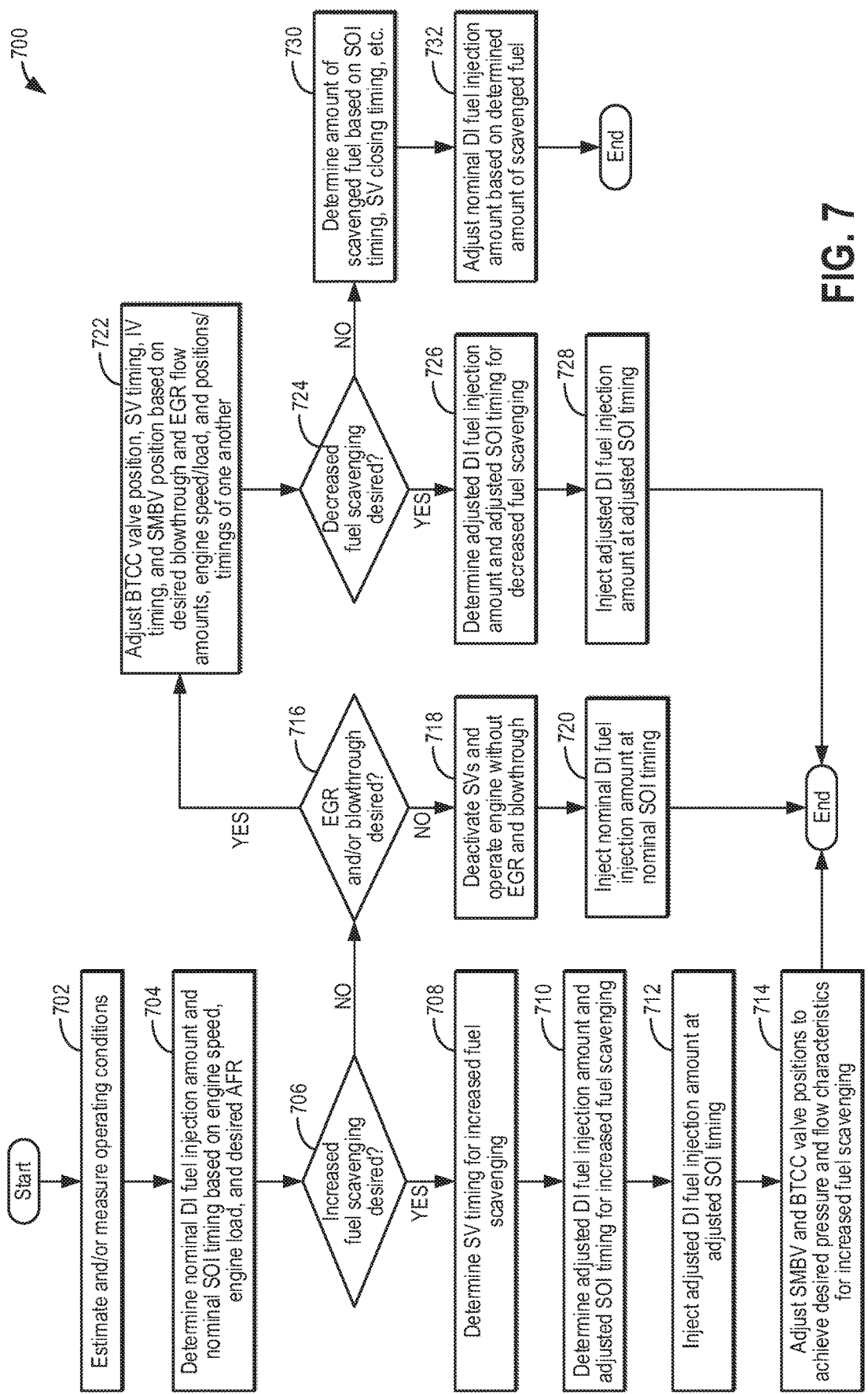
FIG. 7 is a flow chart of an example method for adjusting a start of injection timing of a direct fuel injection in an engine having a split exhaust system based on operating conditions in order to control fuel scavenging through a scavenge exhaust valve.
Figure 8:
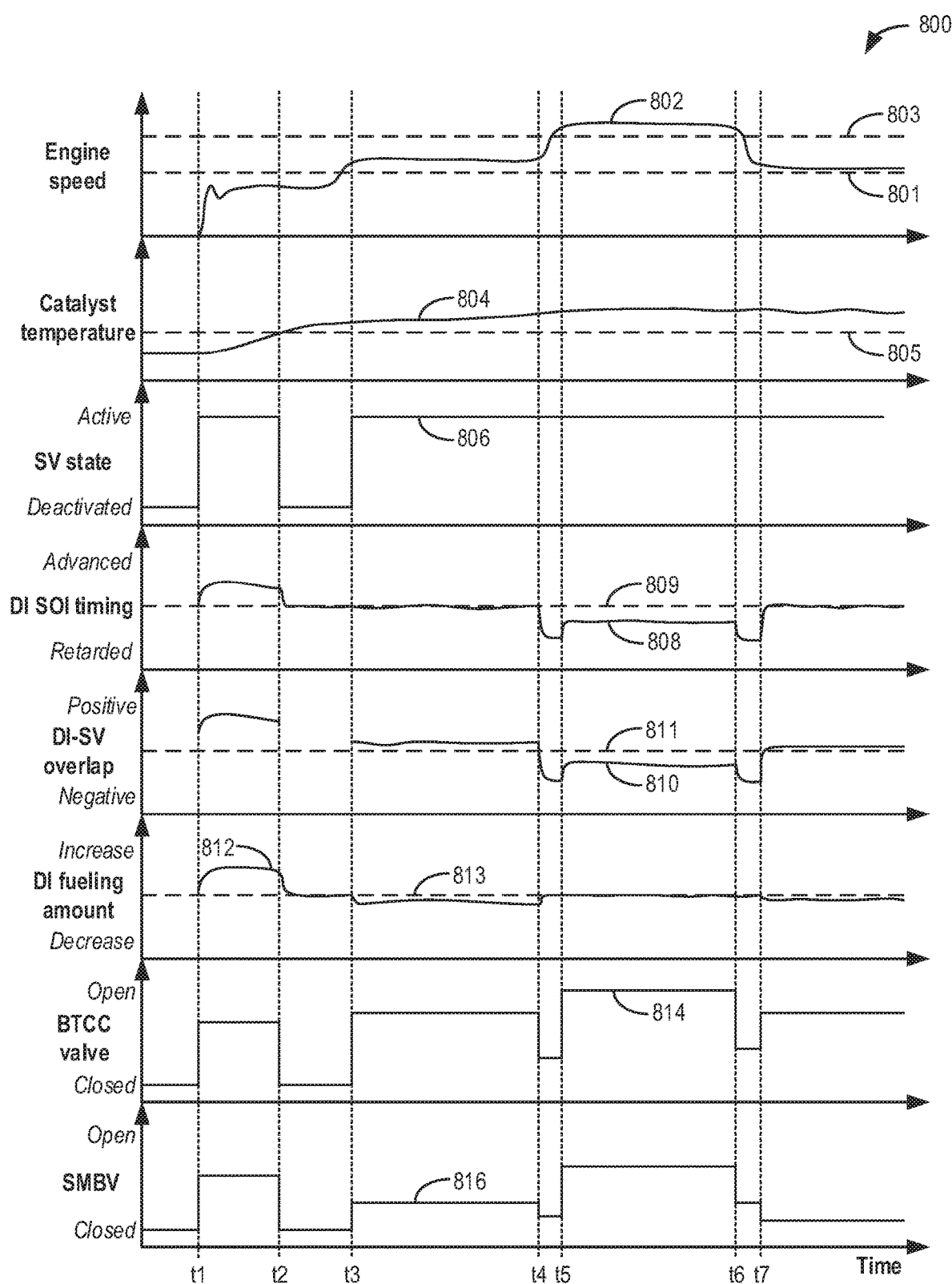
FIG. 8 is a prophetic example timeline showing engine adjustments to increase or decrease fuel scavenging based on operating conditions.

Next, FIG. 7 shows a flow chart of an example method 700 for adjusting operation of an engine having a split exhaust system, such as engine 10 shown in FIGS. 1 and 2. In particular, method 700 enables fuel scavenging to be adjusted, such as to decrease fuel scavenging during transients or to increase fuel scavenging during an engine cold start. As defined herein, fuel scavenging refers to flowing fuel injected into a cylinder during an engine cycle to a scavenge manifold (e.g., scavenge manifold 80 introduced in FIG. 1) via an open second, scavenge exhaust valve (e.g., scavenge exhaust valve 6 introduced in FIG. 1) during that same engine cycle. Instructions for carrying out method 700 and the rest of the methods included herein may be executed by a controller (e.g., controller 12 shown in FIGS. 1 and 2) based on instructions stored on a memory of the controller and in conjunction with signals received from sensors of the engine system, such as the sensors described above with reference to FIGS. 1 and 2. The controller may employ engine actuators of the engine system (e.g., fuel injectors 66, BTCC valve 54, SMBV 97, and scavenge exhaust valve 6 of FIG. 1) to adjust engine operation according to the methods described below.

At 702, method 700 includes estimating and/or measuring operating conditions. Operating conditions may include, for example, a brake pedal position, an acceleration pedal position, operator torque demand, ambient temperature and humidity, barometric pressure, engine speed, engine load, engine temperature, mass air flow (MAF), intake manifold pressure (MAP), intake manifold temperature, oxygen content of intake air/exhaust gases at various points in the engine system, a desired air-fuel ratio (AFR), an actual AFR, a timing of the cylinder intake and exhaust valves, positions of various valves of the engine system (including the BTCC valve), a temperature and/or loading level of one or more emission control devices, pressures in the exhaust system (e.g., exhaust manifolds, exhaust ports, and/or exhaust passages), etc. The operating conditions may be measured or inferred based on available data.

At 704, method 700 includes determining a nominal DI fuel injection amount and a nominal SOI timing (at least partially) based on engine speed, engine load, and the desired AFR. For example, the controller may estimate a cylinder charge mass based on an amount of airflow entering the engine, determined from a plurality of engine operating parameters, such as engine speed, MAP, manifold temperature, engine displacement, and engine volumetric efficiency. The controller may input the plurality of engine operating parameters into a look-up table or equation and output the airflow into the engine. Further, the airflow may be divided by the number of engine cylinders to determine the cylinder charge mass. Then, the controller may use the cylinder charge mass to determine the nominal DI fuel injection amount. The nominal DI fuel injection amount refers to an amount of fuel that will achieve the desired AFR given the cylinder air amount. For example, the controller may calculate the fuel injection amount by dividing the cylinder charge mass by the desired AFR. The controller may then generate a signal with a pulse width corresponding to the nominal DI fuel injection amount to send to fuel injectors. As one example, the desired AFR is stoichiometry. Similarly, the nominal SOI timing for the DI fuel injection may be determined based on engine speed and load. For example, the controller may input the engine operating parameters, including the engine speed and load, into a look-up table, algorithm, or map, which may output the nominal SOI timing.

Further, in examples where DI fuel injection and port fuel injection (PFI) are used, the controller may determine a fraction of a total fuel injection amount to deliver as the DI fuel injection amount. In one example, the amount of fuel to be delivered via port and direct injectors is empirically determined and stored in predetermined look-up tables or functions. For example, one look-up table may correspond to port injection amounts and one look-up table may correspond to direct injections amounts. The two look-up tables may be indexed to engine operating conditions, such as engine speed and engine load, among other engine operating conditions. The look-up tables may output an amount of fuel to inject via port fuel injection and/or direct injection to the engine cylinders at each engine cycle.

Further still, the nominal DI fuel injection amount may be corrected based on exhaust gas oxygen sensor feedback. The exhaust gas oxygen sensor may measure a concentration of oxygen in the exhaust gas, which may then be used to determine the AFR of the exhaust gas. If the AFR of the exhaust gas is leaner than the desired AFR, the controller may increase the nominal DI fuel injection amount, such as by increasing a fuel pulse-width on the next fuel injection event. If the AFR of the exhaust gas is richer than the desired AFR, the controller may increase the nominal DI fuel injection amount, such as by decreasing the fuel pulse-width on the next fuel injection event. The degree to which the fuel injection amount is increased (enriched) or decreased (en-leaned) may be proportional to the deviation of the determined AFR of the exhaust gas from the desired AFR. Thus, the nominal DI fuel injection amount may be controlled in a closed-loop manner.

At 706, it is determined if increased fuel scavenging is desired. As one example, increased fuel scavenging may be desired when an engine cold start condition is present. Therefore, in some examples of the method at 706, determining if increased fuel scavenging is desired may include determining if the cold start condition is present. The cold start condition may be confirmed when the engine is started (e.g., cranked from zero speed to a non-zero speed, with fuel and spark provided to initiated combustion) responsive to an engine start request after a prolonged period of engine inactivity (e.g., after greater than a threshold duration of inactivity) and/or while the engine temperature is lower than a threshold temperature (such as below a light-off temperature of the emission control device(s), below which a conversion efficiency of the emission control device(s) is decreased). As another example, the cold start condition may be confirmed when the engine temperature is substantially equal to the ambient temperature (e.g., within a threshold of the ambient temperature) at engine start. As still another example, the cold start condition may be confirmed when the temperature of the one or more emission control devices is less than the light-off temperature of the one or more emission control devices.

As another example, increased fuel scavenging may be desired when cleaning of an EGR cooler is indicated. The EGR cooler may be positioned in an EGR passage coupled between the scavenge manifold and an intake passage of the engine (e.g., EGR cooler 52 of FIG. 1), and the scavenged fuel may act as a solvent at the EGR cooler to remove grease and debris, for example. Therefore, in some examples, the method at 706 additionally or alternatively includes determining if EGR cooler cleaning is desired. For example, it may be determined that EGR cooler cleaning is desired when a pre-calibrated duration has passed since a last EGR cooler cleaning. As another example, it may be determined that EGR cooler cleaning is desired based on a pressure ratio across the EGR cooler, the pressure ratio referring to a pressure on an inlet-side of the EGR cooler (e.g., that receives gases from the scavenge manifold) relative to a pressure on an outlet-side of the EGR cooler (e.g., that discharges gases toward the intake passage). For example, EGR cooler cleaning may be desired when the pressure ratio across the EGR cooler is greater than a pre-determined threshold pressure ratio that denotes restricted flow through the EGR cooler, such as due to a buildup of grease and/or debris.

If increased fuel scavenging is desired, method 700 proceeds to 708 and includes determining a scavenge exhaust valve (SV) timing, including an opening timing and a closing timing, for the increased fuel scavenging. For example, the scavenge exhaust valves may be operated regardless of whether EGR/blowthrough would be otherwise desired (e.g., based on engine load) so that directly injected fuel may flow through the scavenge exhaust valves as scavenged (e.g., short-circuited) fuel. As one example, the scavenge valve closing timing may be relatively late in the engine cycle, especially at lower engine speeds, in order to increase a positive overlap duration between intake valves and the scavenge exhaust valve. The controller may determine the scavenge exhaust valve timing for the increased fuel scavenging based on engine operating parameters, including engine speed, MAP, and the pressure in the scavenge manifold, such as by inputting the engine operating parameters into a look-up table, algorithm, or map. As another example, the controller may model intake-to-scavenge manifold flow dynamics (e.g., based on intake valve opening and closing timing, MAP, and the scavenge manifold pressure) for a plurality of scavenge exhaust valve opening and closing timings and select the scavenge exhaust valve opening and closing timing that result in a greatest amount of flow through the scavenge exhaust valves. The controller may then operate the scavenge exhaust valves at the determined timing.

At 710, method 700 includes determining an adjusted DI fuel injection amount and an adjusted SOI timing for the increased fuel scavenging. As one example, the SOI timing may be advanced from the nominal DI fuel injection timing. Further, the SOI timing may be advanced to before the scavenge valve closing timing in order to increase an amount of overlap between an open duration of the scavenge exhaust valve and the DI fuel injection. As illustrated above with respect to FIG. 6, advancing the SOI timing to before the scavenge exhaust valve closing timing increases a fuel mass in the scavenge manifold at scavenge exhaust valve closing. Further, at least in some examples, the DI fuel injection amount may be increased from the nominal DI fuel injection amount. For example, the DI fuel injection amount may be increased in order to direct unburnt scavenged fuel to the one or more emission control devices in response to a cold start condition. As one example, the controller may increase the DI fuel injection amount from the nominal DI fuel injection amount by a pre-determined amount. As another example, the controller may input the adjusted SOI timing, the scavenge valve closing timing, MAP, and the scavenge manifold pressure into one or more look-up tables, algorithms, or maps, which may output the adjusted fuel injection amount for the increased fuel scavenging. In some examples, the DI fuel injection amount may additionally be adjusted based on the temperature of the emission control device(s), such as by further increasing the DI fuel injection amount the further the temperature of the emission control device(s) is below the light-off temperature. Further, advancing the SOI timing cannot exceed a threshold amount of advancement. For example, advancing the SOI timing beyond the threshold amount of advancement may result in cylinder wall or piston impingement and increase particulate matter emissions. Additionally, the threshold amount of advancement may be calibrated such that maximum fuel-cylinder air charge heat transfer is achieved at timings not exceeding the threshold amount of advancement in order to utilize the charge cooling benefit of direct injection.

At 712, method 700 includes injecting the adjusted DI fuel injection amount at the adjusted SOI timing. For example, the controller may actuate the fuel injector with a pulse-width corresponding to the adjusted DI fuel injection amount beginning at the adjusted SOI timing. At 714, method 700 includes adjusting the scavenge manifold bypass valve (SMBV) and BTCC valve positions to achieve desired pressure and flow characteristics for the increased fuel scavenging. For example, an opening of the SMBV, disposed in a bypass passage that couples the scavenge manifold to an exhaust passage of the engine, may be increased during an engine cold start to increase a portion of scavenged fuel that flows directly to the exhaust passage and to the emission control device(s), without recirculating through the EGR passage. Flowing scavenged fuel directly to the exhaust passage may further expedite warm up of the emission control device(s). However, recirculating the scavenged fuel through the EGR passage may increase evaporation of the scavenged fuel, which may reduce particulate matter emissions during the cold start. Therefore, the controller may adjust the SMBV and the BTCC valve positions in order to control an amount of flow through the bypass passage relative to an amount of flow through the EGR passage. For example, the controller may input relevant operating conditions, including MAP, scavenge manifold pressure, a pressure of the exhaust passage, the adjusted DI SOI timing and adjusted DI fuel injection amount, and the temperature of the emission control device(s), into a look-up table, algorithm, or map, which may output the corresponding SMBV and BTCC valve positions. As another example, when EGR cooler cleaning is desired, the SMBV may be further closed, if open, while the BTCC valve is further opened in order to direct a greater portion of the scavenged fuel through the EGR cooler. Following 714, method 700 may end.

Returning to 706, if increased fuel scavenging is not desired, method 700 proceeds to 716 and includes determining if EGR and/or blowthrough are desired. EGR and blowthrough may be delivered to the intake passage of the engine upstream of a turbocharger compressor via the scavenge manifold. For example, if the engine load is above a threshold load, EGR and blowthrough to the intake passage may be desired and enabled, the threshold load corresponding to an engine load above which engine dilution is desired to reduce an occurrence of engine knock. In another example, if the BTCC hardware of the engine (e.g., the BTCC valve and/or the scavenge exhaust valves) is activated, then EGR and blowthrough may be enabled. For example, it may be determined that the BTCC hardware is activated if the scavenge exhaust valves are operating (e.g., not deactivated) and the BTCC valve is open or at least partially open.

If neither EGR nor blowthrough are desired, method 700 proceeds to 718 and includes deactivating the scavenge exhaust valves and operating the engine without EGR and blowthrough. For example, this may include maintaining the scavenge exhaust valves closed and routing exhaust gases from the engine cylinders to only the exhaust passage via the blowdown exhaust valves. As one example, the controller may send a deactivation signal to the valve actuators of the scavenge exhaust valves (e.g., exhaust valve timing actuator 103 shown in FIG. 2) to deactivate the scavenge exhaust valve of every cylinder. Further, the method at 718 may include operating the engine without external EGR. Alternatively, if the scavenge exhaust valves are already deactivated, the scavenge exhaust valves may remain deactivated.

At 720, method 700 includes injecting the nominal DI fuel injection amount at the nominal SOI timing (e.g., each determined above at 704). For example, the DI fuel injection amount will not be adjusted for the purpose of fuel scavenging, and the DI fuel injection timing will not be adjusted to either increase or decrease fuel scavenging. Following 720, method 700 ends.

Returning to 716, if at least one of EGR and blowthrough is desired, method 700 proceeds to 722 and includes adjusting the BTCC valve position, a timing of the scavenge exhaust valve, a timing of the intake valve(s), and the SMBV position based on a desired blowthrough and EGR flow amounts, engine speed/load, and positions/timings of one another. As one example, the BTCC valve may be opened in response to the engine being boosted (e.g., with the turbocharger compressor operating and resulting in MAP greater than atmospheric pressure). As another example, if more of less EGR flow or blowthrough to the intake passage via the scavenge manifold and EGR passage is desired relative to currently estimated levels (e.g., as estimated based on an output of a pressure sensor and/or oxygen sensor positioned in the first and/or second scavenge manifolds), the controller may adjust the positions or timings of one or more of the BTCC valve, the scavenge exhaust valve, the intake valves, and the SMBV to achieve the desired EGR flow and blowthrough flow. For example, if increased EGR is desired, the controller may increase the opening of the BTCC valve, advance scavenge exhaust valve timing, and/or decrease the opening of the SMBV. If instead decreased EGR is desired, the controller may reduce the opening of the BTCC valve, retard the scavenge exhaust valve timing, and/or increase the opening of the SMBV. As another example, if increased blowthrough is desired, the controller may retard the scavenge exhaust valve timing, advance the intake valve timing, reduce the opening of the SMBV, and/or increase the opening of the BTCC valve. If decreased blowthrough is desired, the controller may advance the scavenge exhaust valve timing, retard the intake valve timing, increase the opening of the SMBV, and/or decrease the opening of the BTCC valve. Further, adjusting the valve positions and timings at 722 may include adjusting the valve positions and/or timings relative to the positions and timings of one another, such as to increase or decrease an overlap of the scavenge exhaust valve open duration with that of the intake valves or the blowdown exhaust valves.

In another example of the method at 722, the scavenge manifold pressure at certain scavenge exhaust valve timings may change the control of the BTCC valve, the SMBV, and/or the intake valves. For example, if the BTCC valve is closed and a desired scavenge manifold pressure is lower than the currently measured scavenge manifold pressure, the method at 722 may include opening or increasing the amount of opening of the SMBV to decrease the scavenge manifold pressure. As another example, the scavenge exhaust valve timing may be adjusted based on the measured scavenge manifold pressure. In one example, in response to the measured scavenge manifold pressure being greater than the desired scavenge manifold pressure, the method may include retarding the scavenge exhaust valve timing to decrease the scavenge manifold pressure. The desired scavenge manifold pressure may be determined based on (e.g., as a function of) one or more of MAP, exhaust pressure, and/or boost conditions (e.g., whether the engine is boosted or not). Further, in response to adjusting the scavenge exhaust valve timing based on the measured pressure and in response to the desired scavenge manifold pressure, the positions of the BTCC valve and/or the SMBV may be adjusted. For example, after adjusting the scavenge exhaust valve timing, the position of the SMBV may be adjusted to maintain the scavenge manifold pressure at the desired scavenge manifold pressure (based on engine operating conditions), and the position of the BTCC valve may be adjusted to maintain EGR flow at a desired EGR flow (e.g., based on engine operating conditions such as engine load, knock, and compressor operating conditions such as temperature and speed).

The above described valve adjustments performed at 722 may be described as a baseline EGR and BTCC mode. However, other modes may be selected based on engine operating conditions.

At 724, it is determined if decreased fuel scavenging is desired. For example, it may be possible to map the amount of scavenged fuel based on the SOI timing, the scavenge valve closing timing, and the relative pressures of the intake manifold (e.g., MAP) and the scavenge manifold during steady-state operation, but pressure sensor readings may not be accurate enough to map the amount of scavenged fuel during transient conditions. Therefore, in one example of the method at 724, decreased fuel scavenging is desired during transient conditions in order avoid fuel recirculation and fuel loss that is unaccounted for, which may degrade engine performance. For example, the transient condition may include a tip-in or a tip-out of the accelerator pedal.

As another example, decreased fuel scavenging may be desired at higher engine speeds and loads, as an overlap between the nominal DI fuel SOI timing and the scavenge exhaust valve closing timing increases at higher engine speeds and loads. For example, the nominal SOI timing may be advanced as the engine speed and load increases, and the nominal scavenge exhaust valve closing timing may be advanced at high engine speeds, resulting in increased short-circuited DI fuel. Therefore, in another example of the method at 724, decreased fuel scavenging is desired when the engine is operating in a speed-load region that results in a high creation of scavenged fuel. For example, the controller may reference the operating conditions against an engine map to determine if the engine is operating in a speed-load region that results in a high creation of scavenged fuel. As one example, the engine map may be divided into speed-load regions according to an amount of short-circuited fuel predicted to be created (e.g., no significant creation, low creation, and high creation) based on the nominal SOI timing and nominal scavenge exhaust valve closing timing for the given engine speed and load. As another example, the controller may compare the engine speed to a threshold engine speed and determine that decreased fuel scavenging is desired in response to the engine speed being greater than the threshold engine speed. The threshold engine speed may be calibrated to define engine speeds above which the high creation of scavenged fuel is expected. Further, at least in some examples, the threshold engine speed may vary based on engine load.

If decreased fuel scavenging is desired, method 700 proceeds to 726 and includes determining an adjusted DI fuel injection amount and adjusted SOI timing for decreased fuel scavenging. As one example, the SOI timing may be retarded from the nominal DI fuel injection timing. Further, the SOI timing may be retarded to after the scavenge valve closing timing in order to decrease or eliminate amount of overlap between the open duration of the scavenge exhaust valve and the DI fuel injection. As illustrated above with respect to FIG. 6, retarding the SOI timing to after the scavenge exhaust valve closing timing decreases the fuel mass in the scavenge manifold at scavenge exhaust valve closing. Further, at least in some examples, the DI fuel injection amount may be decreased from the nominal DI fuel injection amount. For example, the DI fuel injection amount may be decreased in order to compensate for a decreased amount of recirculated unburnt fuel. As an example, the controller may input the adjusted SOI timing, the scavenge valve closing timing, MAP, and the scavenge manifold pressure into one or more look-up tables, algorithms, or maps, which may output the adjusted fuel injection amount for the decreased fuel scavenging. Moreover, the SOI timing may not be retarded further in the intake stroke in order to ensure proper mixing of fuel in the intake stroke and utilize the charge cooling benefit associated with a direct injection system.

At 728, method 700 includes injecting the adjusted DI fuel injection amount at the adjusted SOI timing. For example, the controller may actuate the fuel injector with a pulse-width corresponding to the adjusted DI fuel injection amount beginning at the adjusted SOI timing. Following 728, method 700 ends.

Returning to 724, if decreased fuel scavenging is not desired, method 700 proceeds to 730 and includes determining an amount of scavenged fuel based on the SOI timing, the closing timing of the scavenge exhaust valve, and other operating parameters that affect fuel flow through the scavenge exhaust valve, such as MAP and the scavenge manifold pressure. For example, the controller may input the SOI timing, the scavenge exhaust valve closing timing, MAP, and the scavenge manifold pressure into a look-up table, algorithm, or map, which may output the expected amount of scavenged fuel for the input operating conditions.

At 732, method 700 includes adjusting the nominal fuel injection amount based on the determined amount of scavenged fuel. For example, the controller may adjust the fuel injection amount from the nominal fuel injection amount to account for lost fuel that is short-circuited through the scavenge exhaust valve instead of combusted. As another example, the controller may adjust the fuel injection amount from the nominal fuel injection amount to account for unburnt fuel in the EGR flow. Therefore, the controller may also determine the amount of unburnt fuel recirculated to the intake manifold, such as based on an EGR flow rate and the amount of scavenged fuel. The EGR flow rate may be determined using a pressure differential across a venturi located at an outlet of the EGR passage, such as measured by a first pressure sensor upstream of BTCC valve (e.g., pressure sensor 53 shown in FIG. 1) and a second pressure sensor upstream of an inlet to the venturi (e.g., pressure sensor 51 shown in FIG. 1). The controller may add to the nominal fuel injection amount to account for the lost fuel while simultaneously subtracting from the nominal fuel injection amount to account for the scavenged fuel in the EGR flow, for example. Following 732, method 700 ends.

Thus, in one example, method 700 may include determining a condition for increased fuel scavenging, and in response thereto, adjusting (e.g., advancing) a start of injection of a fuel direct injection to increase an amount of overlap between the fuel direct injection and an open duration of a scavenge exhaust valve; and determining a condition for decreased fuel scavenging, and in response thereto, adjusting (e.g., retarding) the start of injection of the fuel direct injection to decrease the amount of overlap between the fuel direct injection and the open duration of the scavenge exhaust valve. In some examples, increasing the amount of overlap between the fuel direct injection and the open duration of the scavenge exhaust valve occurs while or during the condition for increased fuel scavenging, and decreasing the amount of overlap between the fuel direct injection and the open duration of the scavenge exhaust valve occurs while the condition for increased fuel scavenging is not present and/or while or during the condition for decreased fuel scavenging. Further, method 700 may include operating in the condition for increased fuel scavenging, operating in the condition for decreased fuel scavenging, and operating in a condition for unadjusted fuel scavenging. In response to determining the condition for unadjusted fuel scavenging is present, the method may include not adjusting the start of injection of the fuel direct injection to either increase or decrease the amount of overlap between the fuel direct injection and the open duration of the scavenge exhaust valve.

Further, instructions stored in memory may include instructions for determining the condition for increased fuel scavenging from an engine temperature sensor and/or an exhaust temperature sensor, and in response, adjusting the start of injection of the fuel direct injection by instructions for sending a signal to a fuel injector at a timing that is advanced from a nominal timing. Additionally, instructions stored in memory may include instructions for determining the condition for decreased fuel scavenging from an engine speed sensor, and in response, adjusting the start of injection of the fuel direct injection by instructions for sending a signal to the fuel injector at a timing that is retarded from the nominal timing. In some examples, the method may include determining whether to perform advancing the start of injection of the fuel direct injection from the nominal timing or retarding the start of injection from the nominal timing based on a determination of whether the condition for increased fuel scavenging is present and a determination of whether the condition for decreased fuel scavenging is present. As an example, the method may include instructions for scheduling the start of injection at a timing that is adjusted from the nominal timing based on a determination of whether the condition for decreased fuel scavenging is present or the condition for increased fuel scavenging is present. Further, the method may include instructions for actuating the fuel injector at the scheduled start of injection timing.

Next, FIG. 8 shows an example timeline 800 of engine adjustments to increase or decrease fuel scavenging in a vehicle having a split exhaust system engine, such as the engine system shown in FIGS. 1 and 2, based on operating conditions. For example, a controller (e.g., controller 12 of FIGS. 1 and 2) may evaluate operating conditions, and may advance a direct injection start of injection (SI DOI) timing in response to a condition for increased fuel scavenging being present, such as according to the example method of FIG. 7. Similarly, the controller may retard the DI SOI timing in response to a condition for decreased fuel scavenging being present.

In example timeline 800, engine speed is shown in plot 802, catalyst temperature is shown in plot 804, scavenge exhaust valve (SV) state is shown in plot 806, DI SOI timing is shown in plot 808, an amount of overlap between the DI SOI timing and an open duration of the SV (e.g., DI-SV overlap) is shown in plot 810, a DI fueling amount is shown in plot 812, a position of a BTCC valve (e.g., BTCC valve 54 of FIG. 1) is shown in plot 814, and a position of a SMBV (e.g., SMBV 97 of FIG. 1) is shown in plot 816. For all of the above, the horizontal axis represents time, with time increasing along the horizontal axis from left to right. The vertical axis represents each labeled parameter. For plots 802 and 804, a value of the labeled parameter (engine speed and catalyst temperature, respectively) increases along the vertical axis from bottom to top. For plot 806, the vertical axis shows the SV state as either active (e.g., operating to open and close at scheduled timings throughout an engine cycle) or deactivated (e.g., maintained closed through the engine cycle), as labeled. For plot 808, the vertical axis shows the DI SOI timing advanced or retarded relative to a nominal timing represented by dashed line 809. Note that the nominal timing of dashed line 809 may change from engine cycle to engine cycle based on operating conditions (such as engine speed, engine load, etc.). For plot 810, the vertical axis shows the DI-SV overlap as positive (e.g., the SOI is before the SV closes) or negative (e.g., the SOI is after the SV closes) relative to no overlap (e.g., the SOI occurs at a SV closing timing) represented by dashed line 811. For plot 812, the vertical axis shows the DI fueling amount as increased or decreased relative to a nominal DI fueling amount represented by dashed line 813. Not that the nominal DI fueling amount of dashed line 813 may change from engine cycle to engine cycle based on operating conditions. For plots 814 and 816, the vertical axis shows the position of the BTCC valve and the SMBV, respectively, from fully closed ("closed") to fully open ("open"), as labeled.

Prior to time t1, the vehicle is off. With the vehicle off, the engine is at rest, with an engine speed of zero (plot 802). The SVs are deactivated (plot 806), the BTCC valve is closed (plot 814), and the SMBV is closed (plot 816). Fuel is not provided, and so there is no DI SOI timing (plot 808), no DI-SV overlap (plot 810), and no DI fueling amount (plot 812). At time t1, the vehicle is turned on and the engine is started to an engine speed (plot 802) that is less than a first threshold engine speed (dashed line 801) for operating with blowthrough and EGR. However, the temperature of the catalyst (plot 804) is less than a light-off temperature of the catalyst (dashed line 805), indicating that a cold start condition, and therefore a condition for increased fuel scavenging, is present. In response to the cold start condition, the controller activates the SVs (plot 806) so that directly injected fuel can be short-circuited through the SVs and to a scavenge manifold coupled thereto (e.g., scavenge manifold 80 of FIG. 1). Further, the controller advances the DI SOI timing (plot 808) from the nominal timing (dashed line 809), thereby increasing an amount of positive overlap between the direct injection and the SV open duration (plot 810), and opens the BTCC valve so that a first portion of the short-circuited fuel is recirculated to an intake of the engine via an EGR passage. Further still, the DI fueling amount (plot 812) is increased from the nominal fueling amount (dashed line 813), and the SMBV is partially opened so that a second portion of the short-circuited fuel is directed to an exhaust passage upstream of the catalyst without being recirculated to the engine intake. As a result of the increased fueling and the fuel scavenging, the catalyst temperature (plot 804) increases between time t1 and time t2.

At time t2, the catalyst temperature (plot 804) reaches its light-off temperature (dashed line 805). As a result, the cold start condition, and the condition for increased fuel scavenging, is no longer present. Further, the engine speed (plot 802) remains below the first threshold engine speed (dashed line 801) for operating with EGR and blowthrough. In response, the SVs are deactivated (plot 806), the BTCC valve is closed (plot 814), and the SMBV is closed (plot 816) so that EGR and blowthrough is not provided. The DI fueling amount is decreased (plot 812) to the nominal fueling amount (dashed line 813), and the DI SOI timing (plot 808) is returned to the nominal timing (dashed line 809).

At time t3, the engine speed (plot 802) increases above the first threshold engine speed (dashed line 801). As a result, EGR and blowthrough are desired. In response, the controller activates the SVs (plot 806), opens the BTCC valve (plot 814), and partially opens the SMBV (plot 816) to provide a desired amount of EGR and blowthrough. The DI SOI timing (plot 808) is not adjusted from the nominal timing (dashed line 809), as decreased fuel scavenging is not desired. Operating the SVs and performing the fuel direct injection at the nominal DI SOI timing results in a small amount of DI-SV overlap (plot 810), and the controller decreases the DI fueling amount (plot 812) to compensate for scavenged fuel.

Between time t4 and time t5, a tip-in event occurs, resulting in a transient condition. In response to the transient condition, decreased fuel scavenging is desired, and the controller adjusts the DI SOI timing (plot 808) to a timing that is retarded from the nominal timing (dashed line 809). As a result, the DI-SV overlap becomes negative (plot 810). With the amount of fuel scavenging decreased, the controller increases the DI fueling amount (plot 812) to the nominal fueling amount (dashed line 813). Further, the BTCC valve (plot 814) and the SMBV (plot 816) are further closed to decrease flow through the SVs to the scavenge manifold.

At time t5, the engine speed (plot 802) stabilizes at a speed that is higher than a second threshold engine speed (dashed line 803), above which decreased fuel scavenging is desired because a creation of short-circuited fuel is high. In response, the DI SOI timing (plot 808) remains retarded from the nominal timing (dashed line 809). However, the timing may be less retarded than during a transient condition (e.g., as between time t4 and time t5), resulting in a DI-SV overlap amount (plot 810) that is less negative than during a transient condition. Additionally, the BTCC valve (plot 814) and the SMBV (plot 816) are further opened to provide a desired amount of EGR and blowthrough, and the DI fueling amount (plot 812) remains at the nominal amount (dashed line 813).

Between time t6 and time t7, a tip-out event occurs, resulting in a transient condition. In response to the transient condition, decreased fuel scavenging is desired, and the controller again adjusts the DI SOI timing (plot 808) to a timing that is further retarded from the nominal timing (dashed line 809). As a result, the DI-SV overlap becomes more negative (plot 810) than while the engine was operating with the engine speed above the second threshold engine speed (e.g., between time t5 and time t6). The controller maintains the DI fueling amount (plot 812) at the nominal fueling amount (dashed line 813). Further, the BTCC valve (plot 814) and the SMBV (plot 816) are further closed to decrease flow through the SVs to the scavenge manifold to further decrease the amount of fuel short-circuited through the SVs.

At time t7, the engine speed (plot 802) stabilizes at a speed that is greater than the first threshold engine speed (dashed line 801) and less than the second threshold engine speed (dashed line 803), indicating that EGR and blowthrough are desired without mitigating actions to decrease fuel scavenging because the creation of short-circuited fuel is low. In response, the controller adjusts the BTCC valve (plot 814) to a further closed position than while operating at the engine speed above the second threshold engine speed and further closes the SMBV (plot 816) to provide a desired amount of EGR and blowthrough. The DI SOI timing (plot 808) is returned to the nominal timing (dashed line 809), resulting in a small amount of DI-SV overlap (plot 810). The controller decreases the DI fueling amount (plot 812) accordingly to compensate for the scavenged fuel.

In this way, the start of injection of a fuel direct injection may be adjusted to either increase fuel scavenging or decrease fuel scavenging based on the particular operating condition. For example, the start of injection may be retarded to decreased fuel scavenging, thereby preventing fuel loss when fuel loss is difficult to track (e.g., during a transient condition) or to decrease fuel scavenging when its creation is high (e.g., during high engine speed/load conditions). As another example, the start of injection may be advanced to increase fuel scavenging, thereby expediting catalyst heating during a cold start or using scavenged fuel as a solvent for EGR cooler cleaning. Overall, engine operating parameters, including fuel injection amount, spark advance, and intake and exhaust valve actuation, may be more accurately controlled by decreasing fuel scavenging, particularly during conditions during which it cannot be accurately tracked.

The technical effect of retarding a start of injection of a direct injection to decrease an amount of overlap between the direct injection and an open duration of a scavenge exhaust valve is that an amount of fuel in a scavenge manifold at scavenge exhaust valve closing is decreased.

The technical effect of advancing a start of injection of a direct injection to increase an amount of overlap between the direct injection and an open duration of a scavenge exhaust valve is that an amount of fuel in a scavenge manifold at scavenge exhaust valve closing is increased.

As one example, a method comprises: adjusting a start of a direct fuel injection into an engine cylinder including a first exhaust valve coupled to a blowdown manifold and a second exhaust valve coupled to a scavenge manifold based on a closing timing of the second exhaust valve and an operating condition; and adjusting a position of a bypass valve of the scavenge manifold based on the adjusted start of the direct fuel injection. In the preceding example, additionally or optionally, the operating condition includes an engine cold start, and adjusting the start of the direct fuel injection based on the closing timing of the second exhaust valve includes advancing the start of the direct fuel injection relative to the closing timing of the second exhaust valve. In one or both of the preceding examples, additionally or optionally, advancing the start of the direct fuel injection relative to the closing timing of the second exhaust valve includes scheduling the start of the direct fuel injection further before the closing timing of the second exhaust valve to increase an amount of fuel in the scavenge manifold at the closing timing of the second exhaust valve, and actuating a direct fuel injector at the scheduled start of the direct fuel injection. In any or all of the preceding examples, additionally or optionally, advancing the start of the direct fuel injection relative to the closing timing of the second exhaust valve includes increasing an overlap between the direct fuel injection and an open duration of the second exhaust valve. In any or all of the preceding examples, additionally or optionally, adjusting the position of the bypass valve includes further opening the bypass valve as the adjusted start of the direct fuel injection is advanced. In any of the preceding examples, the method additionally or optionally further comprises increasing an amount of fuel injected in the direct fuel injection in response to the engine cold start. In any or all of the preceding examples, additionally or optionally, the operating condition includes one of an engine speed greater than a threshold speed and a transient condition, and the adjusting the start of the direct fuel injection based on the closing time of the second exhaust valve includes retarding the start of the direct fuel injection relative to the closing timing of the second exhaust valve. In any or all of the preceding examples, additionally or optionally, retarding the start of the direct fuel injection relative to the closing timing of the second exhaust valve includes decreasing an overlap between the direct fuel injection and an open duration of the second exhaust valve to decrease an amount of fuel in the scavenge manifold at the closing timing of the second exhaust valve. In any or all of the preceding examples, additionally or optionally, retarding the start of the direct fuel injection relative to the closing timing of the second exhaust valve includes scheduling the start of the direct fuel injection after the closing timing of the second exhaust valve, and actuating a direct fuel injector at the scheduled start of the direct fuel injection. In any or all of the preceding examples, additionally or optionally, adjusting the position of the bypass valve includes further closing the bypass valve as the adjusted start of the direct fuel injection is retarded.

As another example, a method comprises: injecting fuel into a cylinder of an engine via a direct injection, the cylinder coupled to an exhaust passage of the engine via a blowdown exhaust valve and a first exhaust manifold and coupled to an intake passage of the engine via a scavenge exhaust valve and a second exhaust manifold; and adjusting an amount of overlap between the direct injection and an open duration of the scavenge exhaust valve based on an operating condition. In the preceding example, additionally or optionally, adjusting the amount of overlap between the direct injection and the open duration of the scavenge exhaust valve based on the operating condition includes increasing the amount of overlap in response to an engine cold start condition, and increasing the amount of overlap includes advancing a start of injection of the direct injection based on a closing timing of the scavenge exhaust valve. In one or both of the preceding examples, additionally or optionally, adjusting the amount of overlap between the direct injection and the open duration of the scavenge exhaust valve based on the operating condition includes decreasing the amount of overlap in response to a transient engine condition, and decreasing the amount of overlap includes retarding a start of injection of the direct injection based on a closing timing of the scavenge exhaust valve. In any or all of the preceding examples, additionally or optionally, adjusting the amount of overlap between the direct injection and the open duration of the scavenge exhaust valve based on the operating condition includes decreasing the amount of overlap in response to an engine speed greater than a threshold engine speed, and decreasing the amount of overlap includes retarding a start of injection of the direct injection based on a closing timing of the scavenge exhaust valve. In any or all of the preceding examples, the method additionally or optionally further comprises adjusting a bypass valve in a bypass passage that couples the second exhaust manifold to the exhaust passage based on the adjusted amount of overlap, including adjusting the bypass valve to a further open position as the adjusted amount of overlap increases and adjusting the bypass valve to a further closed position as the adjusted amount of overlap decreases.

As another example, a system comprises: an engine having a cylinder, the cylinder including a first exhaust valve and a second exhaust valve; a fuel injector directly coupled to the cylinder; a first exhaust manifold coupled to the first exhaust valve and an exhaust passage of the engine; a second exhaust manifold coupled to the second exhaust valve and an exhaust gas recirculation passage, the exhaust gas recirculation passage coupled to an intake passage of the engine via an exhaust gas recirculation (EGR) passage; and a controller storing executable instructions in non-transitory memory that, when executed, caused the controller to: determine a start of injection timing for a fuel direct injection; actuate the fuel injector at the determined start of injection timing; retard the start of injection timing from the determined start of injection timing in response to a first condition, the retarded start of injection timing selected based on a closing timing of the second exhaust valve; and advance the start of injection timing from the determined start of injection timing in response to a second condition, the advanced start of injection timing selected based on the closing timing of the second exhaust valve. In the preceding example, additionally or optionally, the first condition includes a condition for increased fuel scavenging and the second condition includes a condition for decreased fuel scavenging. In one or both of the preceding examples, additionally or optionally, the fuel scavenging includes flowing directly injected fuel through the second exhaust valve to the second exhaust manifold in a same engine cycle as the fuel direct injection. In any or all of the preceding examples, the system additionally or optionally further comprises a bypass passage coupling the second exhaust manifold to the exhaust passage, the bypass passage including a bypass valve positioned therein, and the controller stores further instructions in non-transitory memory that, when executed, caused the controller to: adjust the bypass valve to a first position in response to the first condition, the first position selected to increase fuel scavenging; and adjust the bypass valve to a second position in response to the second condition, the second position selected to decrease fuel scavenging. In any or all of the preceding examples, the system additionally or optionally further comprises an EGR cooler in the EGR passage, and the first condition includes one or more of an engine cold start and a request for EGR cooler cleaning, and the second condition includes one or more of an engine speed above a threshold speed and a transient engine condition.

In another representation, a method comprises: advancing a start of a direct fuel injection into an engine cylinder including a first exhaust valve coupled to a blowdown manifold and a second exhaust valve coupled to an EGR passage based on a closing timing of the second exhaust valve and a condition of an EGR cooler positioned in the EGR passage. In the preceding example, additionally or optionally, the condition includes an EGR cooler cleaning condition. In one or both of the preceding examples, additionally or optionally, the EGR cooler cleaning condition is present after a threshold duration has elapsed since a previous EGR cooler cleaning event. In any or all of the preceding examples, additionally or optionally, the EGR cooler cleaning condition is present in response to a pressure ratio of the EGR cooler increasing above a threshold pressure ratio. In any or all of the preceding examples, additionally or optionally, advancing the start of the direct fuel injection based on the closing timing of the second exhaust valve includes actuating a fuel injector to perform the direct fuel injection further before the closing timing of the second exhaust valve. In any or all of the preceding examples, additionally or optionally, advancing the start of the direct fuel injection based on the closing timing of the second exhaust valve includes increasing an overlap between the direct fuel injection and an open duration of the second exhaust valve.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting a start of a direct fuel injection into an engine cylinder including a first exhaust valve coupled to a blowdown manifold and a second exhaust valve coupled to a scavenge manifold based on a closing timing of the second exhaust valve and an operating condition; and
adjusting a position of a bypass valve of the scavenge manifold based on the adjusted start of the direct fuel injection.

2. The method of claim 1, wherein the operating condition includes an engine cold start, and adjusting the start of the direct fuel injection based on the closing timing of the second exhaust valve includes advancing the start of the direct fuel injection relative to the closing timing of the second exhaust valve.

3. The method of claim 2, wherein advancing the start of the direct fuel injection relative to the closing timing of the second exhaust valve includes scheduling the start of the direct fuel injection further before the closing timing of the second exhaust valve to increase an amount of fuel in the scavenge manifold at the closing timing of the second exhaust valve, and actuating a direct fuel injector at the scheduled start of the direct fuel injection.

4. The method of claim 2, wherein advancing the start of the direct fuel injection relative to the closing timing of the second exhaust valve includes increasing an overlap between the direct fuel injection and an open duration of the second exhaust valve.

5. The method of claim 2, wherein adjusting the position of the bypass valve includes further opening the bypass valve as the adjusted start of the direct fuel injection is advanced.

6. The method of claim 2, further comprising increasing an amount of fuel injected in the direct fuel injection in response to the engine cold start.

7. The method of claim 1, wherein the operating condition includes one of an engine speed greater than a threshold speed and a transient condition, and the adjusting the start of the direct fuel injection based on the closing time of the second exhaust valve includes retarding the start of the direct fuel injection relative to the closing timing of the second exhaust valve.

8. The method of claim 7, wherein retarding the start of the direct fuel injection relative to the closing timing of the second exhaust valve includes decreasing an overlap between the direct fuel injection and an open duration of the second exhaust valve to decrease an amount of fuel in the scavenge manifold at the closing timing of the second exhaust valve.

9. The method of claim 7, wherein retarding the start of the direct fuel injection relative to the closing timing of the second exhaust valve includes scheduling the start of the direct fuel injection after the closing timing of the second exhaust valve, and actuating a direct fuel injector at the scheduled start of the direct fuel injection.

10. The method of claim 7, wherein adjusting the position of the bypass valve includes further closing the bypass valve as the adjusted start of the direct fuel injection is retarded.

11. A method, comprising:
injecting fuel into a cylinder of an engine via a direct injection, the cylinder coupled to an exhaust passage of the engine via a blowdown exhaust valve and a first exhaust manifold and coupled to an intake passage of the engine via a scavenge exhaust valve and a second exhaust manifold; and
adjusting an amount of overlap between the direct injection and an open duration of the scavenge exhaust valve based on an operating condition.

12. The method of claim 11, wherein adjusting the amount of overlap between the direct injection and the open duration of the scavenge exhaust valve based on the operating condition includes increasing the amount of overlap in response to an engine cold start condition, and increasing the amount of overlap includes advancing a start of injection of the direct injection based on a closing timing of the scavenge exhaust valve.

13. The method of claim 11, wherein adjusting the amount of overlap between the direct injection and the open duration of the scavenge exhaust valve based on the operating condition includes decreasing the amount of overlap in response to a transient engine condition, and decreasing the amount of overlap includes retarding a start of injection of the direct injection based on a closing timing of the scavenge exhaust valve.

14. The method of claim 11, wherein adjusting the amount of overlap between the direct injection and the open duration of the scavenge exhaust valve based on the operating condition includes decreasing the amount of overlap in response to an engine speed greater than a threshold engine speed, and decreasing the amount of overlap includes retarding a start of injection of the direct injection based on a closing timing of the scavenge exhaust valve.

15. The method of claim 11, further comprising adjusting a bypass valve in a bypass passage that couples the second exhaust manifold to the exhaust passage based on the adjusted amount of overlap, including adjusting the bypass valve to a further open position as the adjusted amount of overlap increases and adjusting the bypass valve to a further closed position as the adjusted amount of overlap decreases.

16. A system, comprising:
an engine having a cylinder, the cylinder including a first exhaust valve and a second exhaust valve;
a fuel injector directly coupled to the cylinder;
a first exhaust manifold coupled to the first exhaust valve and an exhaust passage of the engine;

a second exhaust manifold coupled to the second exhaust valve and an exhaust gas recirculation passage, the exhaust gas recirculation passage coupled to an intake passage of the engine via an exhaust gas recirculation (EGR) passage; and a controller storing executable instructions in non-transitory memory that, when executed, cause the controller to:

determine a start of injection timing for a fuel direct injection;

actuate the fuel injector at the determined start of injection timing;

retard the start of injection timing from the determined start of injection timing in response to a first condition, the retarded start of injection timing selected based on a closing timing of the second exhaust valve; and advance the start of injection timing from the determined start of injection timing in response to a second condition, the advanced start of injection timing selected based on the closing timing of the second exhaust valve.

17. The system of claim 16, wherein the first condition includes a condition for increased fuel scavenging and the second condition includes a condition for decreased fuel scavenging.

18. The system of claim 17, wherein the fuel scavenging includes flowing directly injected fuel through the second exhaust valve to the second exhaust manifold in a same engine cycle as the fuel direct injection.

19. The system of claim 17, further comprising a bypass passage coupling the second exhaust manifold to the exhaust passage, the bypass passage including a bypass valve positioned therein, and wherein the controller stores further instructions in non-transitory memory that, when executed, caused the controller to:

adjust the bypass valve to a first position in response to the first condition, the first position selected to increase fuel scavenging; and adjust the bypass valve to a second position in response to the second condition, the second position selected to decrease fuel scavenging.

20. The system of claim 16, further comprising an EGR cooler in the EGR passage, and wherein the first condition includes one or more of an engine cold start and a request for EGR cooler cleaning, and the second condition includes one or more of an engine speed above a threshold speed and a transient engine condition.

* * * * *